US010453248B2

(12) United States Patent
Sawaki

(10) Patent No.: US 10,453,248 B2
(45) Date of Patent: Oct. 22, 2019

(54) METHOD OF PROVIDING VIRTUAL SPACE AND SYSTEM FOR EXECUTING THE SAME

(71) Applicant: COLOPL, Inc., Tokyo (JP)

(72) Inventor: Kazuaki Sawaki, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/975,844

(22) Filed: May 10, 2018

(65) Prior Publication Data

US 2018/0330536 A1    Nov. 15, 2018

(30) Foreign Application Priority Data

May 11, 2017    (JP) ................................. 2017-094790

(51) Int. Cl.
*G06T 15/20* (2011.01)
*G06T 1/00* (2006.01)
*G06F 3/01* (2006.01)

(52) U.S. Cl.
CPC .............. *G06T 15/20* (2013.01); *G06F 3/012* (2013.01); *G06F 3/013* (2013.01); *G06T 1/0007* (2013.01)

(58) Field of Classification Search
CPC ....... G06T 15/20; G06T 1/0007; G06F 3/012; G06F 3/013
See application file for complete search history.

(56) References Cited

U.S. PATENT DOCUMENTS

| 2004/0119733 | A1 | 6/2004 | Morimoto et al. | |
| 2016/0351191 | A1* | 12/2016 | Vilermo | ................. G10L 15/22 |
| 2018/0001198 | A1* | 1/2018 | Frappiea | ............... A63F 13/213 |
| 2018/0189568 | A1* | 7/2018 | Powderly | .................. G06T 7/70 |

FOREIGN PATENT DOCUMENTS

| JP | 2003-141563 A | 5/2003 |
| JP | 2004-70821 A | 3/2004 |
| JP | 2009-176025 A | 8/2009 |
| JP | 2017-78893 A | 4/2017 |
| WO | 2016/063622 A1 | 4/2016 |

OTHER PUBLICATIONS

Office Action in JP Application No. 2017-094790, dated Nov. 21, 2017, 6pp.
Notice of Allowance in JP Application No. 2017-094790, dated Feb. 7, 2018, 6pp.
Josh Constine, "Oculus. VR show self demonstrating self-shooting stick and avatar", published Apr. 14, 2016, Searched Nov. 13, 2017, obtained Apr. 26, 2018 from Internet, https://jp.techcrunch.com/2016/04/14/20160413vr-selfie-stick/.

* cited by examiner

*Primary Examiner* — Aneeta Yodichkas
(74) *Attorney, Agent, or Firm* — Hauptman Ham, LLP

(57) ABSTRACT

A method according to at least one aspect of this disclosure includes defining a virtual space. The method further includes receiving a first sound signal from a first user associated with a head-mounted device (HMD). The method further includes capturing an image in the virtual space in accordance with the reception of the first sound signal. The method further includes storing the captured image corresponding to at least a part of the virtual space in accordance with the capturing of the image.

7 Claims, 29 Drawing Sheets

| PHOTOGRAPHED IMAGE | USER ID | PANORAMA IMAGE ID | PHOTOGRAPHED IMAGE POSITION | VIEWPOINT POSITION | PHOTOGRAPHING TIMING |
|---|---|---|---|---|---|
| IMAGE DATA XXX | 190A | 22A | X1, Y1, Z1 | X2, Y2, Z2 | 05:03 |
| IMAGE DATA YYY | 190B | 22B | X3, Y3, Z3 | X4, Y4, Z4 | null |
| ... | ... | ... | ... | ... | ... |

METHOD OF PROVIDING VIRTUAL SPACE AND SYSTEM FOR EXECUTING THE SAME

RELATED APPLICATIONS

The present application claims priority to Japanese Application No. 2017-094790, filed on May 11, 2017, the disclosure of which is hereby incorporated by reference herein in its entirety.

TECHNICAL FIELD

This disclosure relates to image processing in a virtual space, and more particularly, to a technology for controlling image timing.

BACKGROUND

A technology for providing a virtual space (virtual reality space) by using a head-mounted device (HMD) is known. There have been proposed various technologies for enriching an experience of a user in the virtual space.

For example, in Japanese Patent Application Laid-open No. 2003-141563 (Patent Document 1), there is described a technology for forming an alter-ego (avatar) of oneself in a virtual space by "extracting facial feature points required for individual identification from photographed information obtained by photographing a head of a subject from two directions, namely, from the front and the side, recreating a three-dimensional structure of each facial part such as a head skeletal structure, a nose, a mouth, eyebrows, and eyes based on the facial feature points, and integrating the facial parts to recreate a three-dimensional shape of the face".

In Non-Patent Document 1, there is described a technology for imaging an avatar arranged in a virtual space by a virtual camera.

PATENT DOCUMENT

[Patent Document 1] JP 2003-141563 A

NON-PATENT DOCUMENT

[Non-Patent Document 1] "Oculus demos a VR Selfie Stick and Avatar" [online], [retrieved on Apr. 10, 2017], Internet (URL: http://jp.techcrunch.com/2016/04/14/20160413vr-selfie-stick/)

SUMMARY

According to at least one embodiment, there is provided a method including defining a virtual space. The method further includes receiving a first sound signal emitted by a first user associated with a head-mounted device (HMD). The method further includes executing imaging in the virtual space in accordance with the reception of the first sound signal. The method further includes storing a photographed image corresponding to at least a part of the virtual space in accordance with the execution of the photography.

The above-mentioned and other objects, features, aspects, and advantages of the disclosure may be made clear from the following detailed description of this disclosure, which is to be understood in association with the attached drawings.

BRIEF DESCRIPTION OF THE DRAWINGS

FIG. 30 A table of a data structure of an image according to at least one embodiment of this disclosure.

DETAILED DESCRIPTION

Now, with reference to the drawings, embodiments of this technical idea are described. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as apart of the embodiments described in this disclosure.

[Configuration of HMD System]

Figure 1:
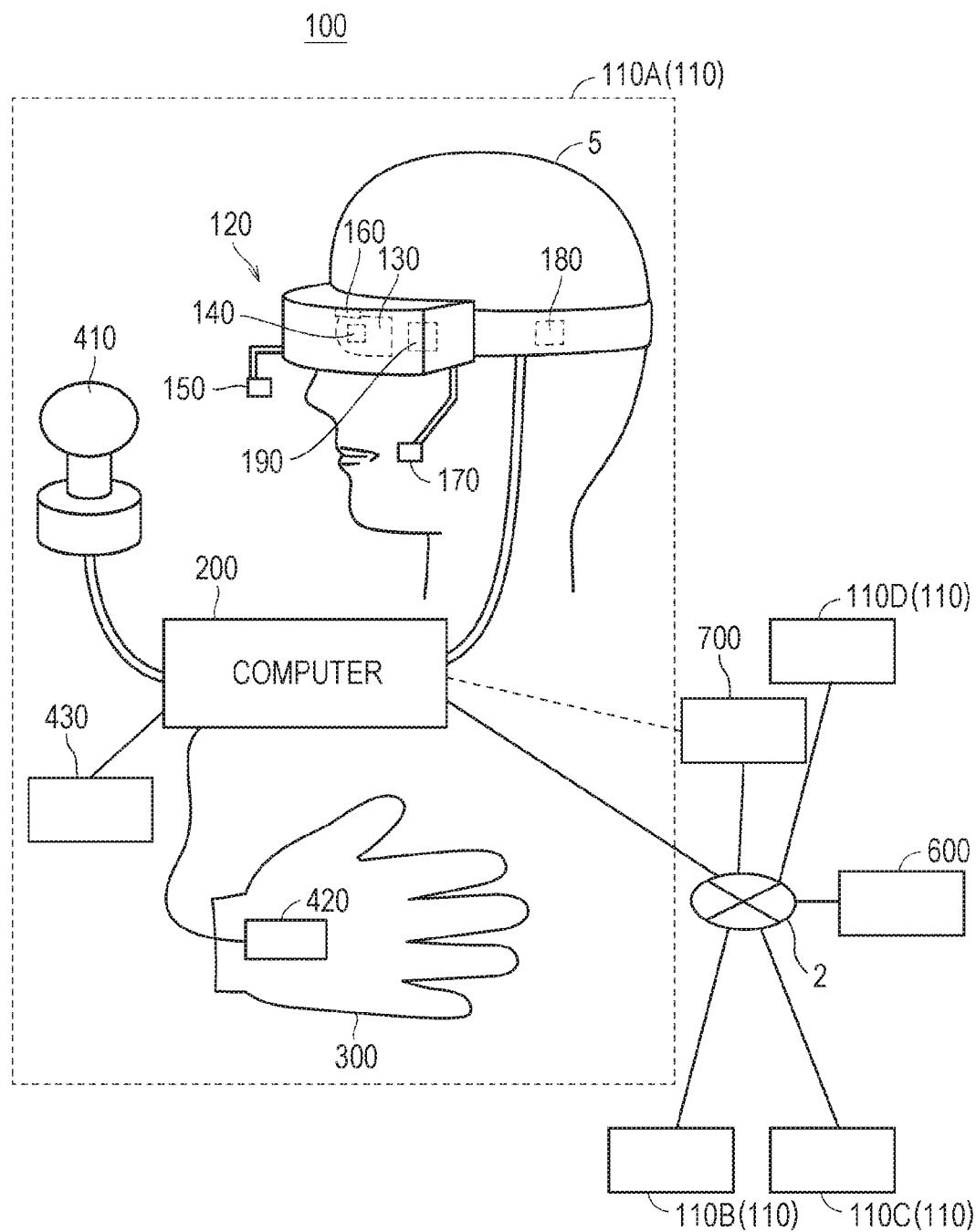
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
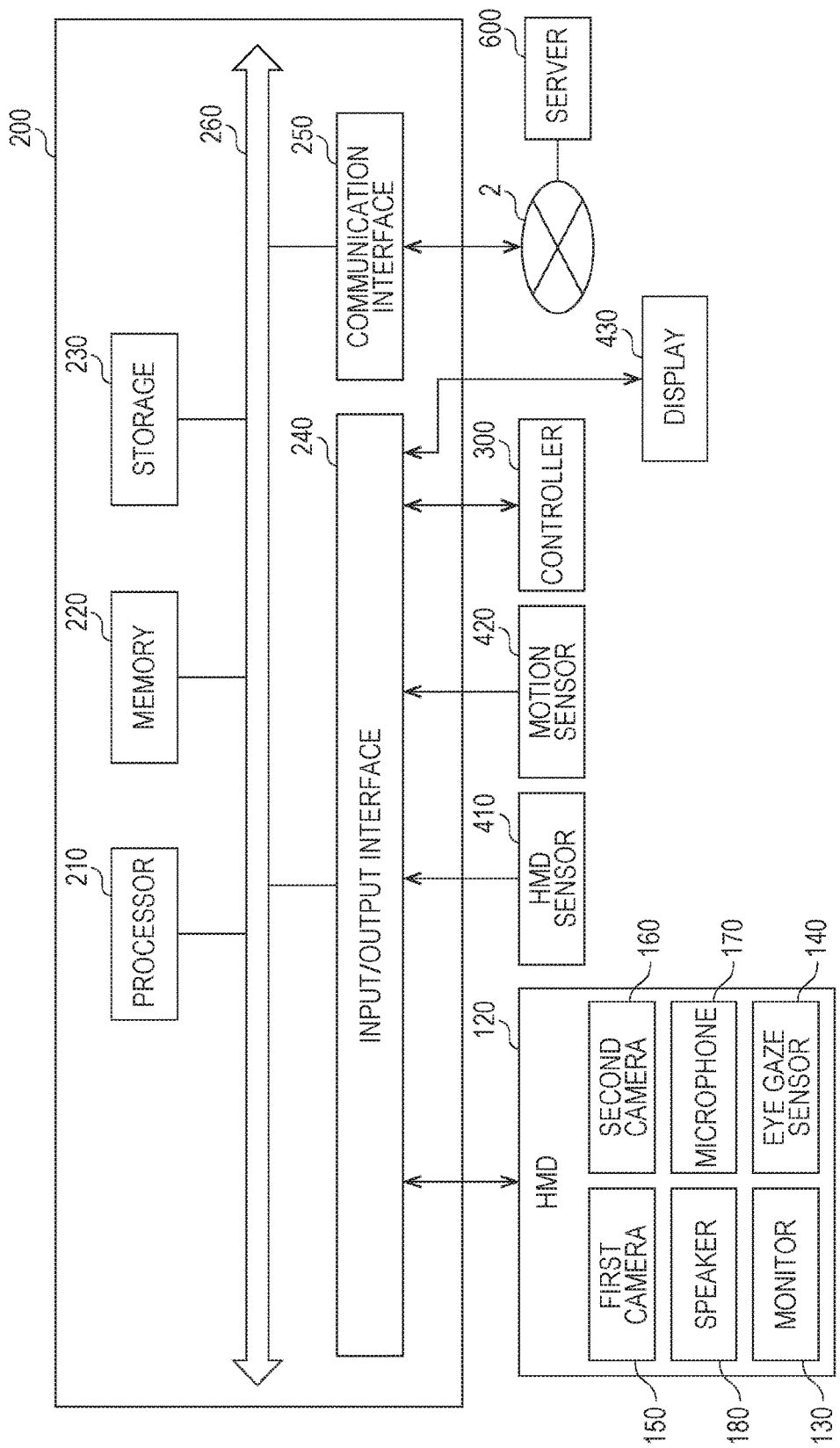
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
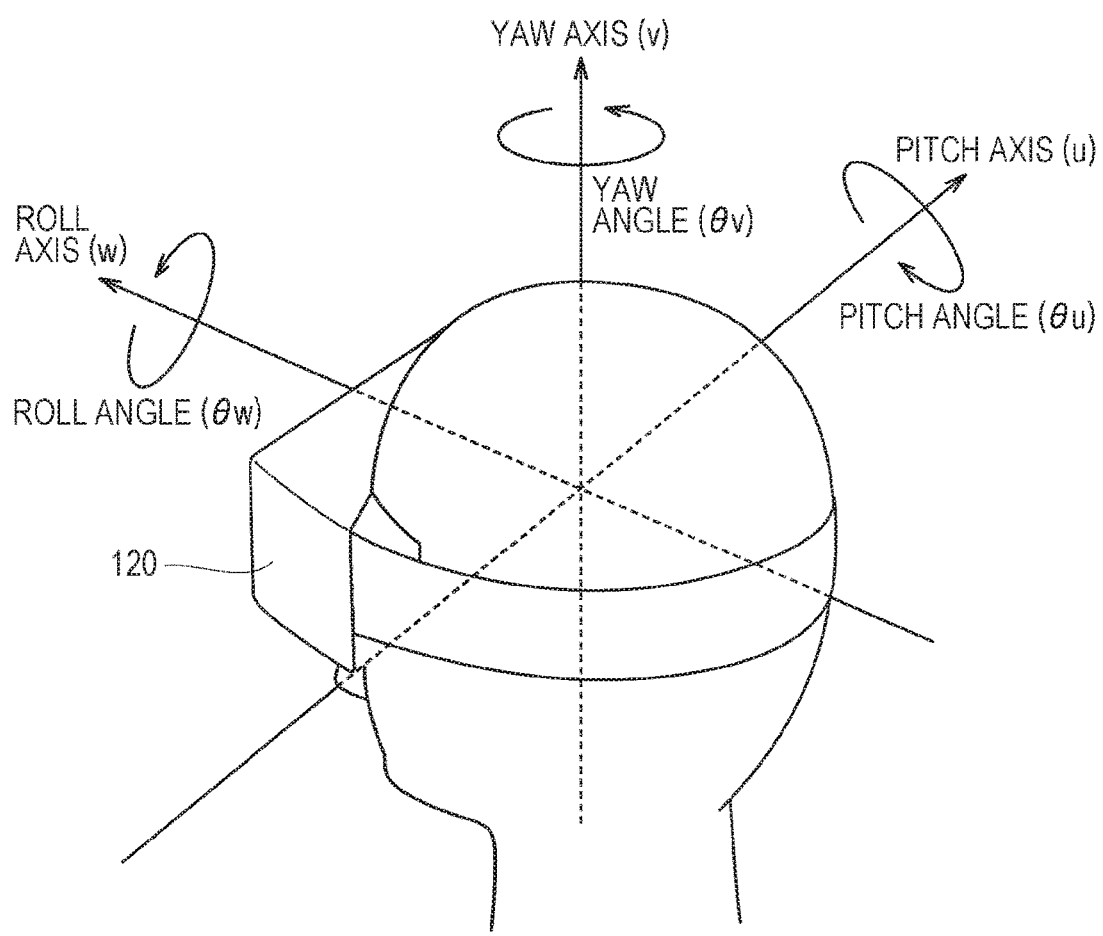
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle ($\theta u$), a yaw angle ($\theta v$), and a roll angle ($\theta w$) of the HMD 120 in the uvw visual-field coordinate system. The pitch angle ($\theta u$) represents an inclination angle of the HMD 120 about the pitch axis in the uvw visual-field coordinate system. The yaw angle ($\theta v$) represents an inclination angle of the HMD 120 about the yaw axis in the uvw visual-field coordinate system. The roll angle ($\theta w$) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
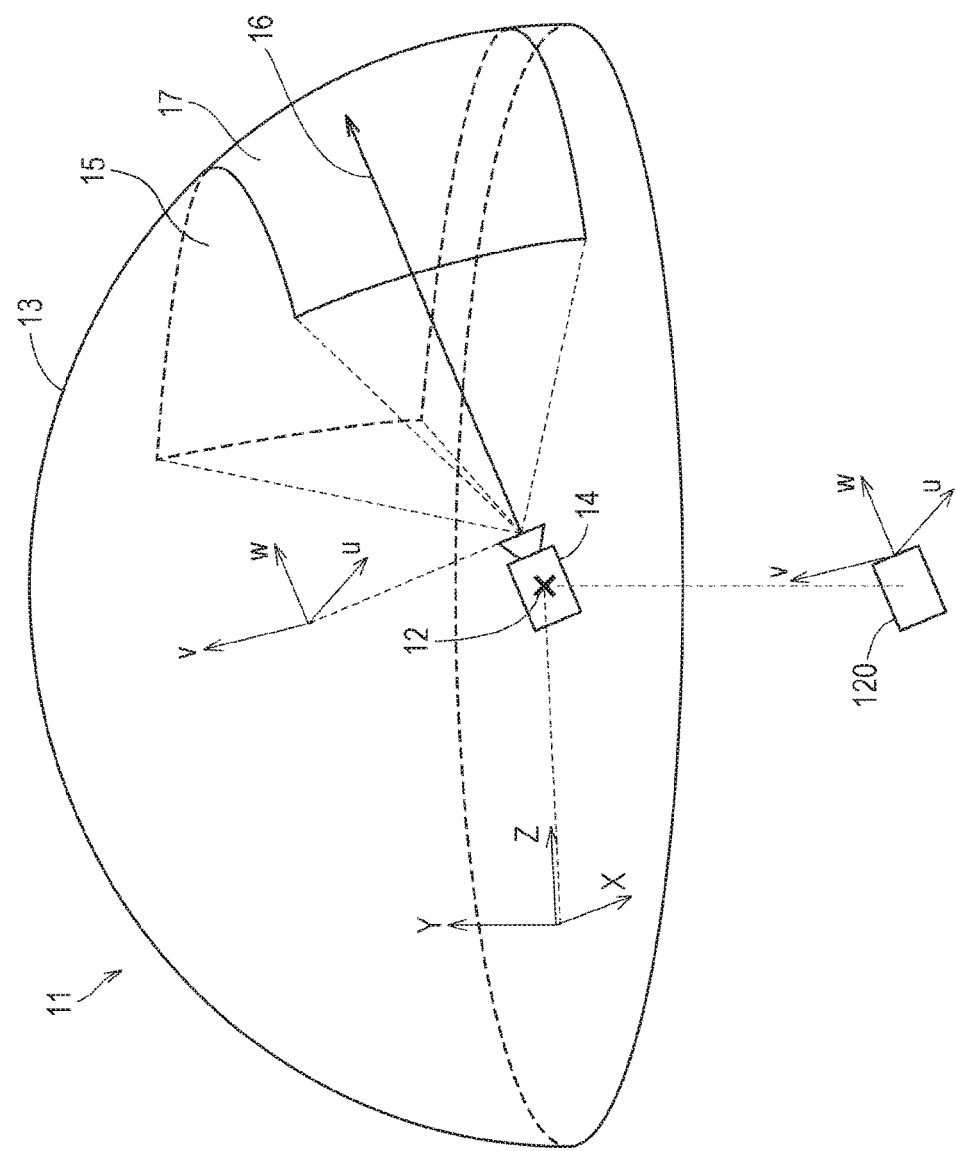
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
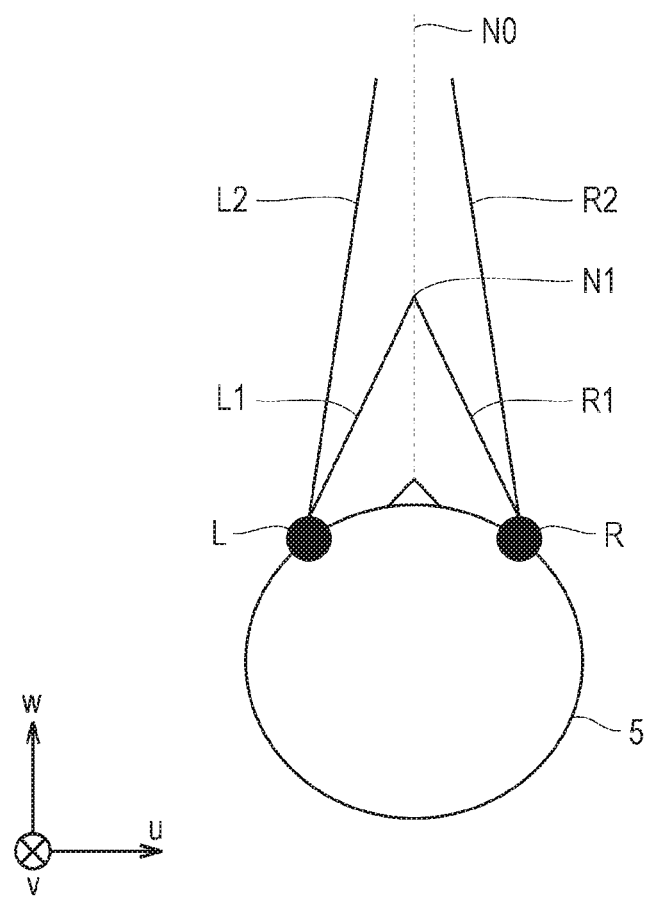
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
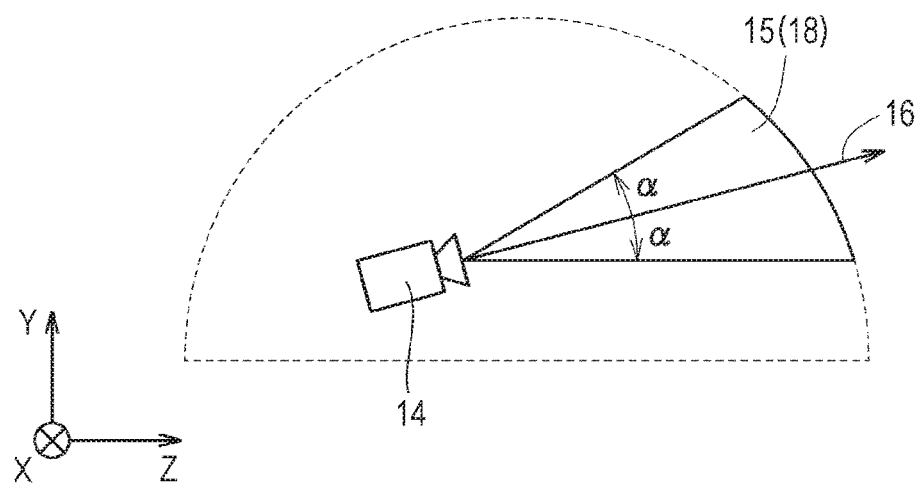
FIG. 6 A diagram of a YZ cross section obtained by viewing a field-of-view region from an X direction in the virtual space according to at least one embodiment of this disclosure.
Figure 7:
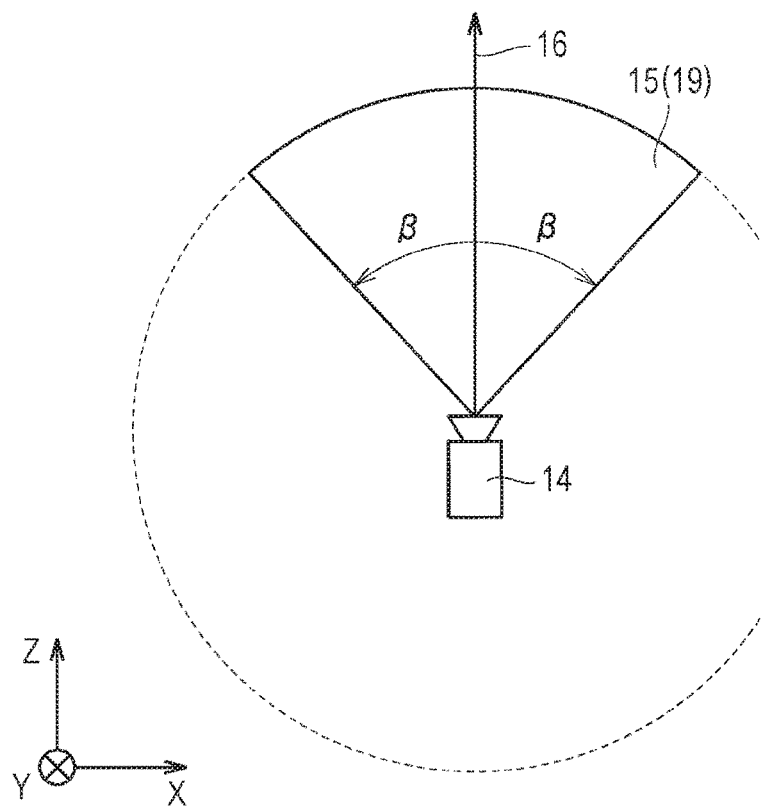
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to apart of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
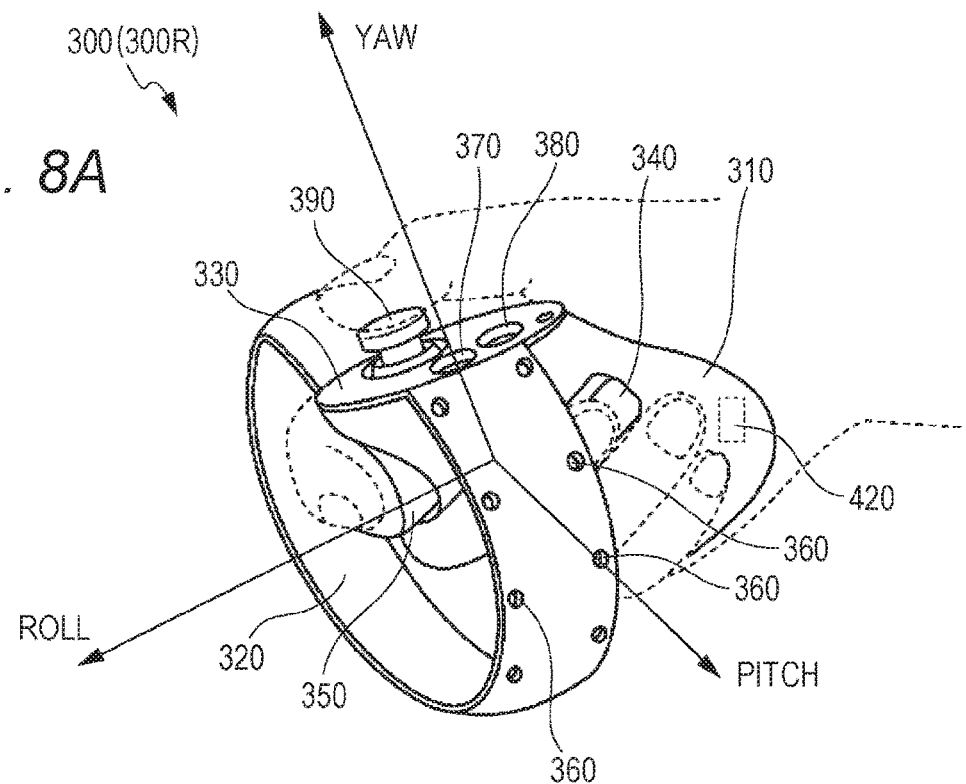
FIG. 8A A diagram of a schematic configuration of a controller according to at least one embodiment of this disclosure.
Figure 8B:
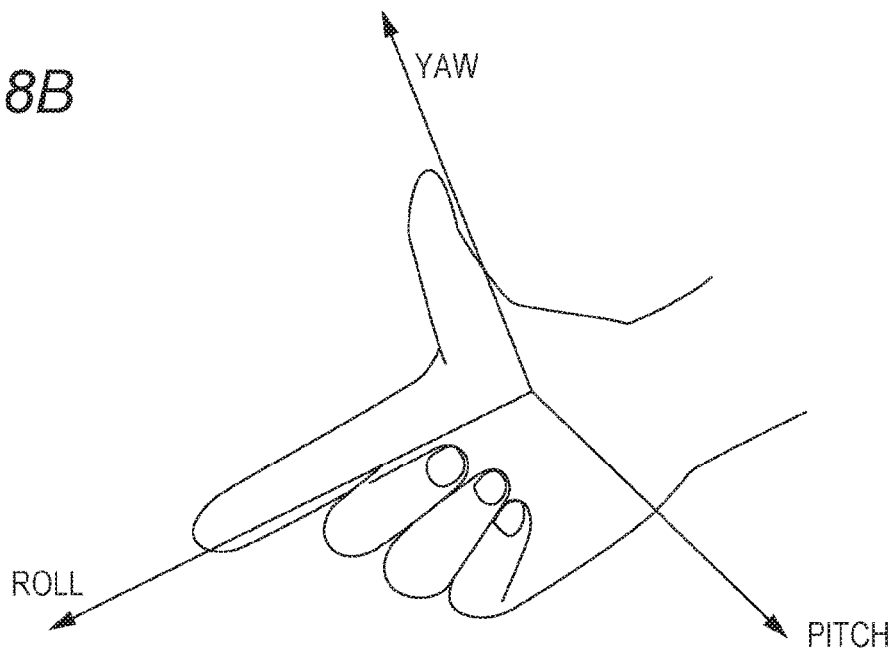
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

Figure 9:
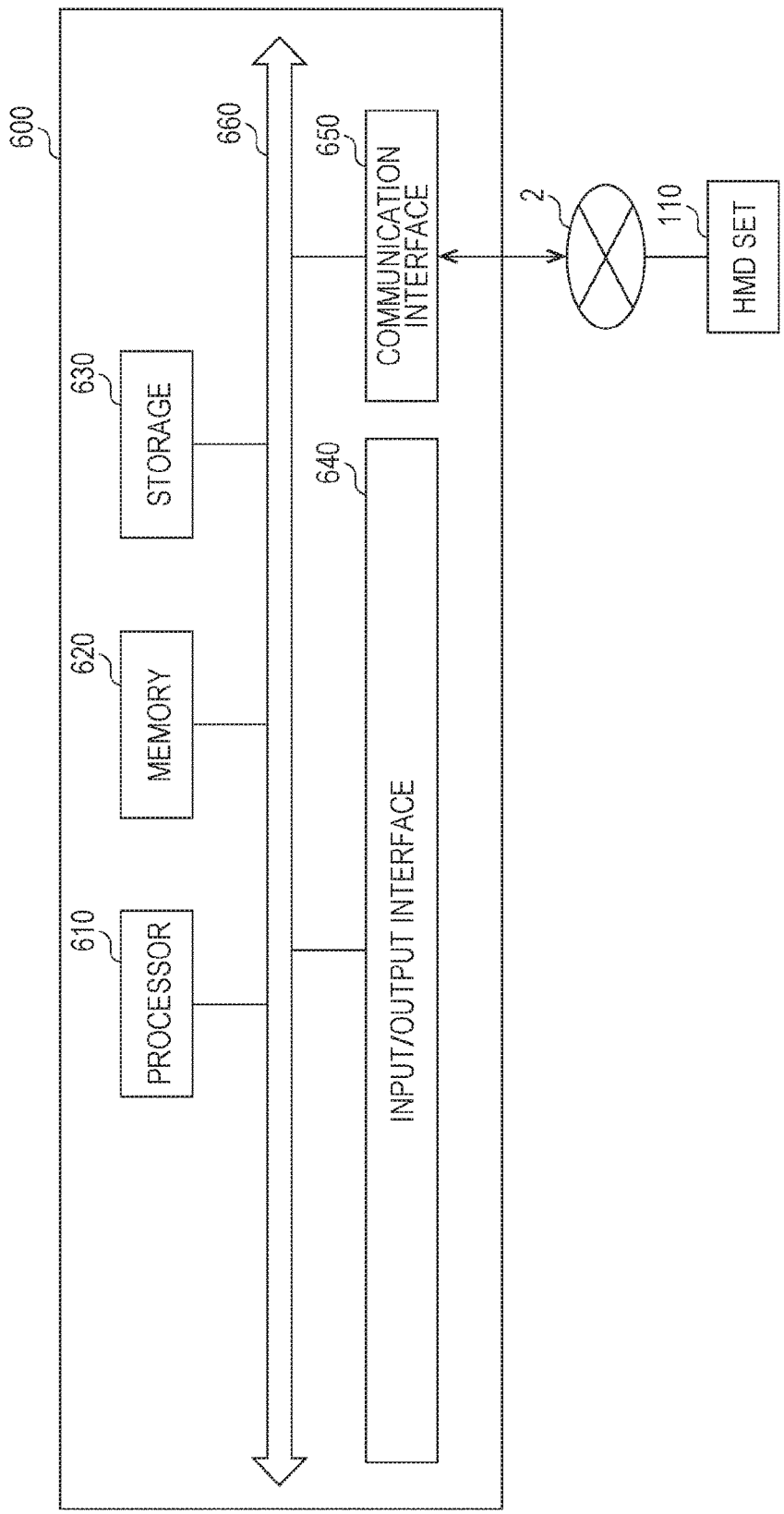
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
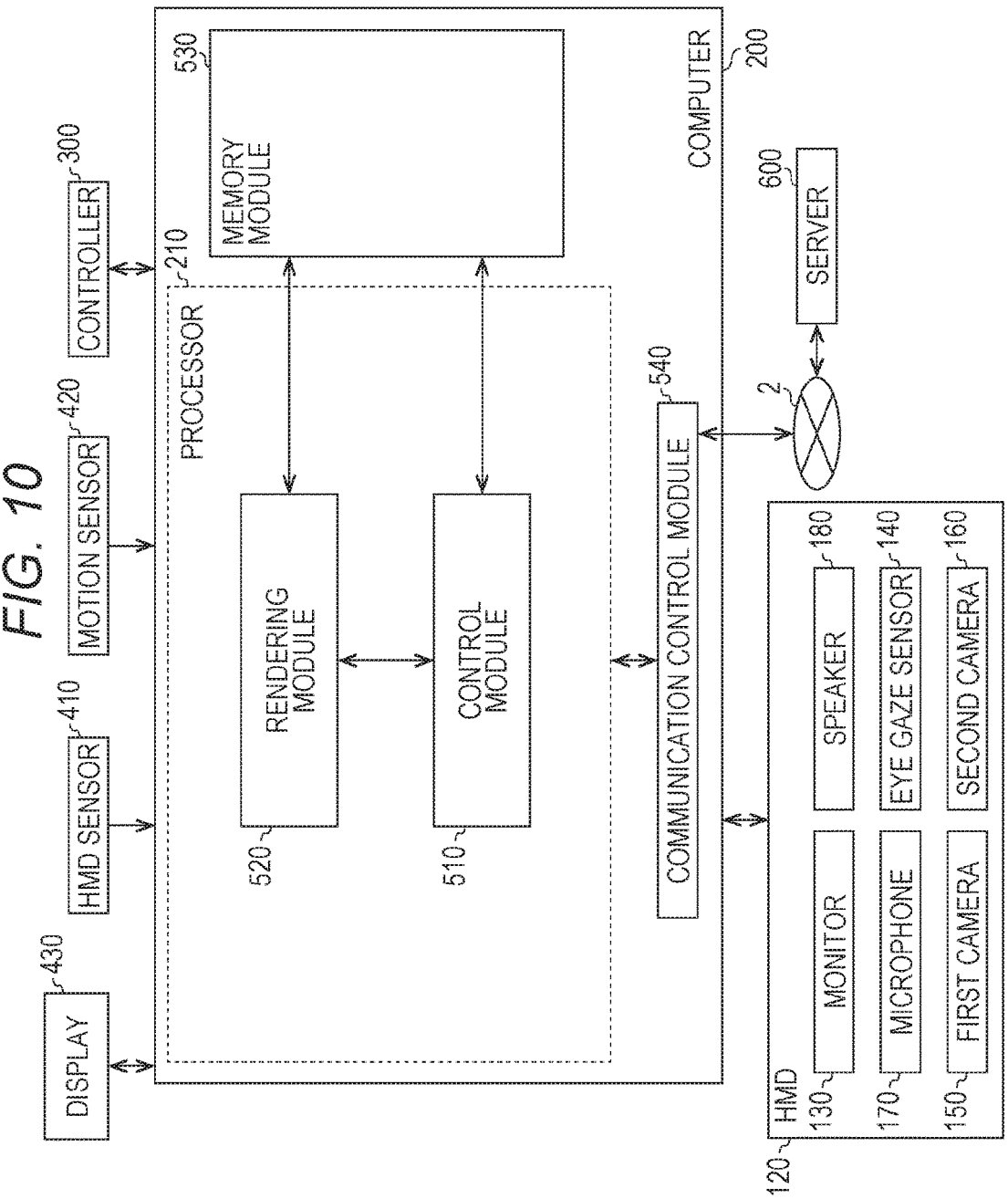
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
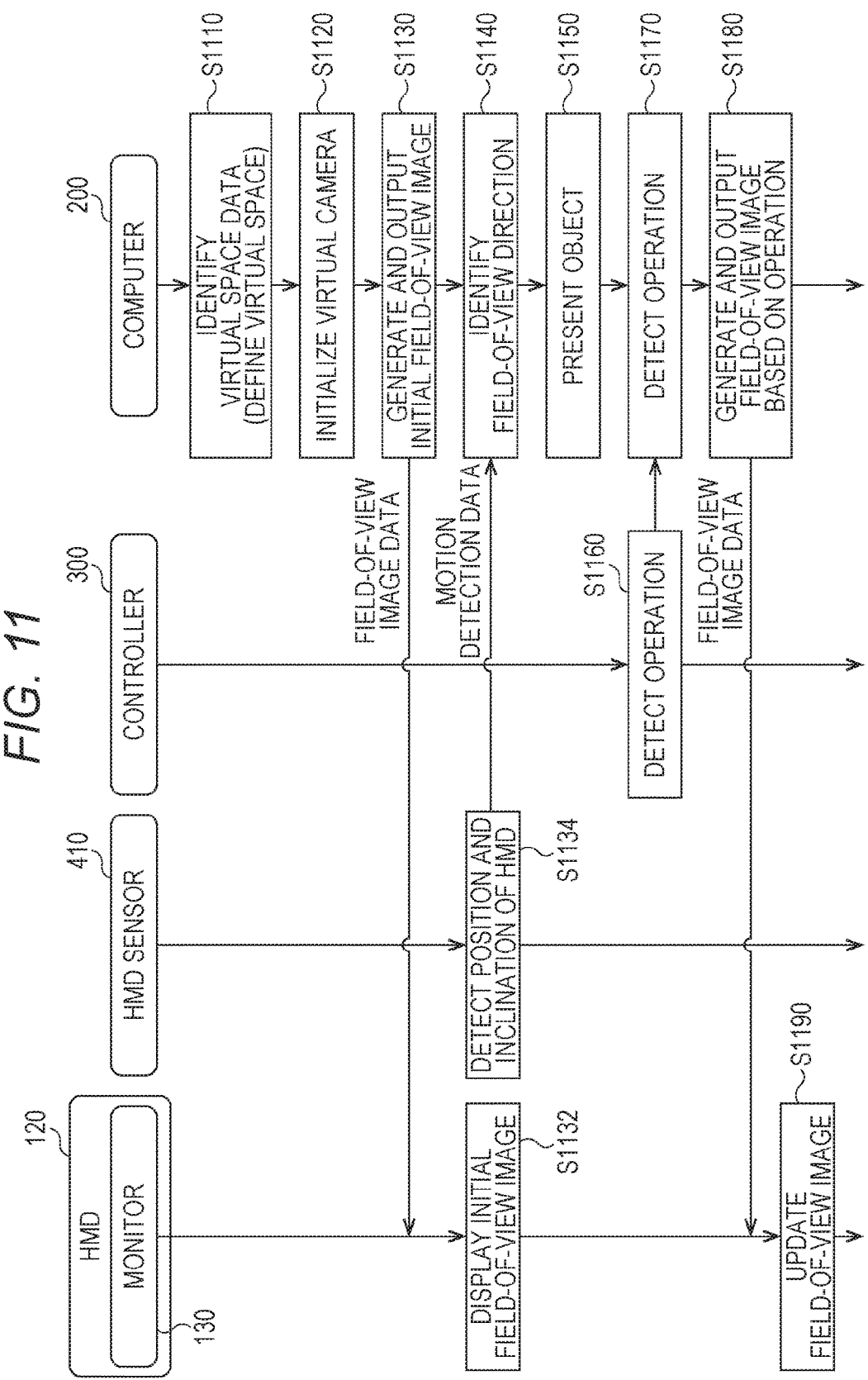
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
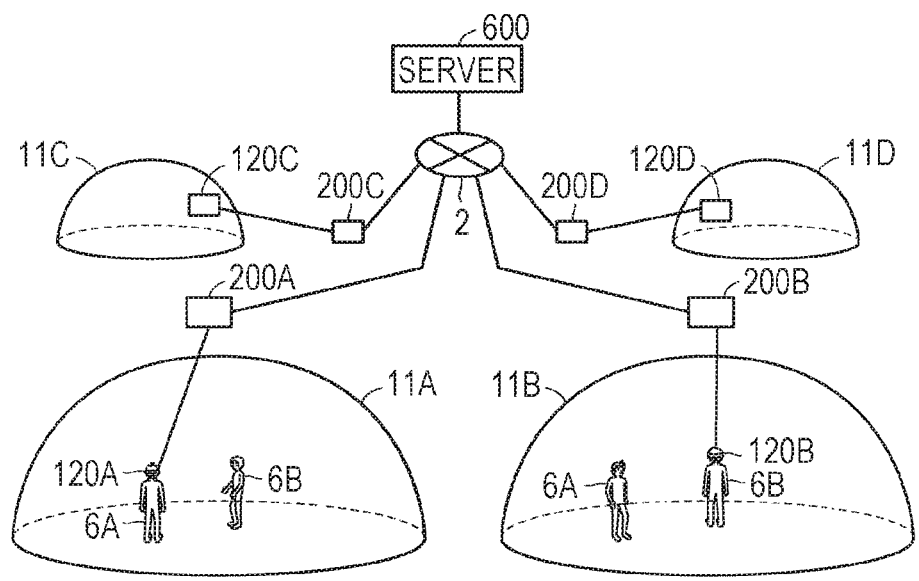
FIG. 12A A schematic diagram of HMD systems of several users sharing the virtual space interact using a network according to at least one embodiment of this disclosure.
Figure 12B:
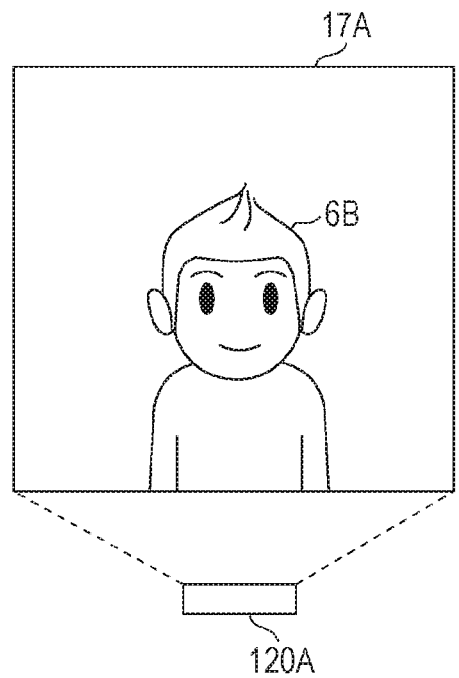
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
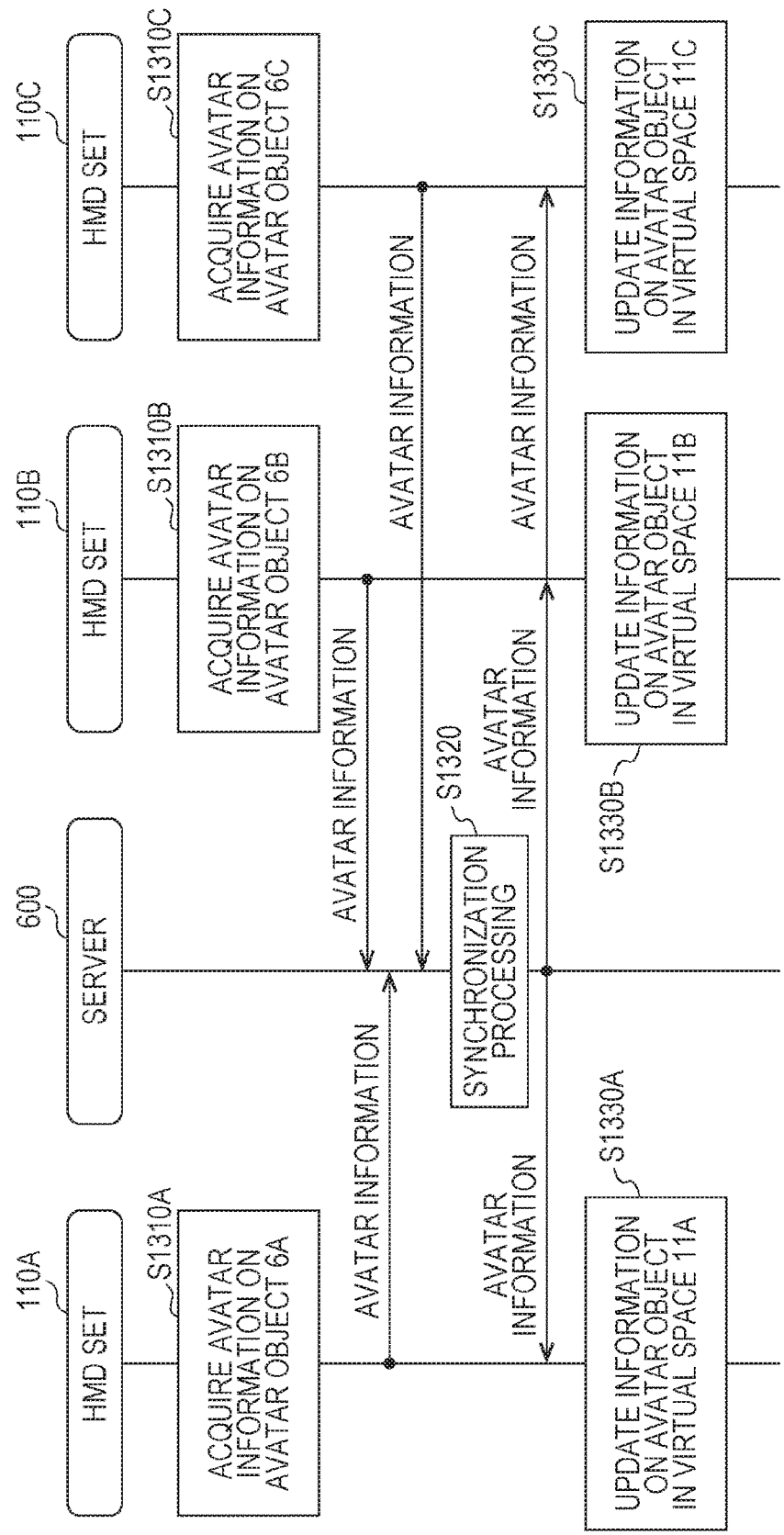
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Detailed Configuration of Modules]

Figure 14:
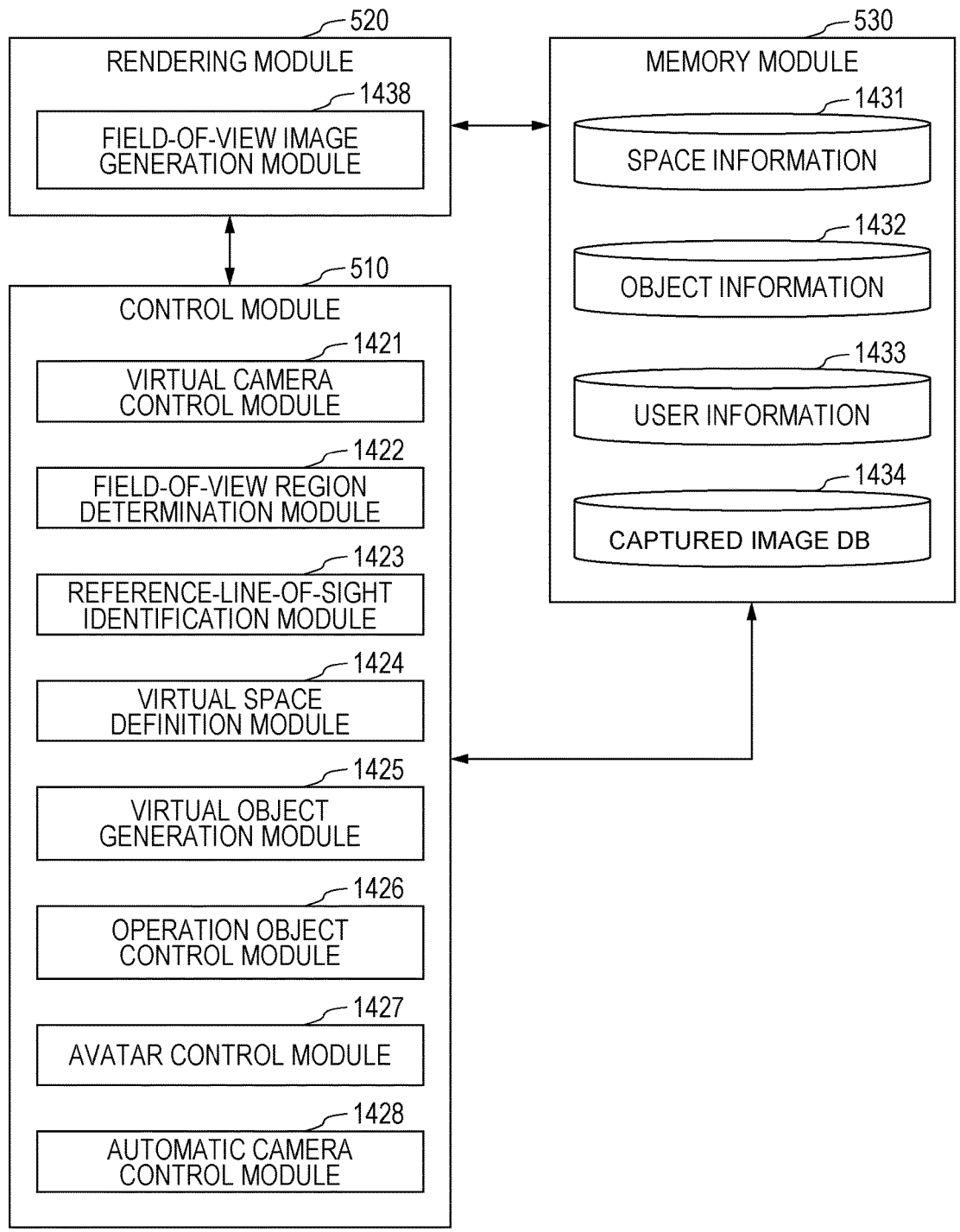
FIG. 14 A block diagram of modules of the computer according to at least one embodiment of this disclosure.

With reference to FIG. 14, details of a module configuration of the computer 200 are described. FIG. 14 is a block diagram of detailed configuration of modules of the computer 200 according to at least one embodiment of this disclosure.

In FIG. 14, the control module 510 includes a virtual camera control module 1421, a field-of-view region determination module 1422, a reference-line-of-sight identification module 1423, a virtual space definition module 1424, a virtual object generation module 1425, an operation object control module 1426, an avatar control module 1427, and an automatic camera control module 1428. The rendering module 520 includes a field-of-view image generation module 1438. The memory module 530 stores space information 1431, object information 1432, user information 1433, and captured image DB 1434.

In at least one aspect, the control module 510 controls an image displayed on the monitor 130 of the HMD 120.

The virtual camera control module 1421 arranges the virtual camera 14 in the virtual space 11. The virtual camera control module 1421 controls a position in the virtual space 11 at which the virtual camera 14 is arranged and the inclination (direction) of the virtual camera 14. The field-of-view region determination module 1422 determines the field-of-view region 23 based on the inclination of the virtual camera 14 and the position at which the virtual camera 14 is arranged. The field-of-view image generation module 1438 generates the field-of-view image 17 to be displayed on the monitor 130 based on the determined field-of-view region 23.

The reference-line-of-sight identification module 1423 detects the inclination direction (w direction) of the HMD 120 based on the output of the HMD sensor 410. The virtual camera control module 1421 controls the inclination of the virtual camera 14 based on the inclination direction of the HMD 120 detected by the reference-line-of-sight identification module 1423. In at least one aspect, the reference-line-of-sight identification module 1423 identifies the line of sight of the user 5 based on the inclination of the HMD 120 and a signal from the eye gaze sensor 140.

The automatic camera control module 1428 arranges an automatic camera 1861, which is described later, in the virtual space 11. The automatic camera 1861 is configured so as to be capable of capturing the virtual space 11. In at least one embodiment, the capturing of the virtual space 11 includes photographing the virtual space. In at least one embodiment, the image captured is a still image. In at least one embodiment, the image captured is moving image. In at least one embodiment, the capturing of the image is described as photographing. More specifically, the automatic camera 1861 captures a part of the panorama image 13 forming the virtual space 11, an avatar object, and other objects. In at least one aspect, the automatic camera 1861 is configured to automatically capture an image when an image capturing condition is satisfied, regardless of the operation of the user 5.

The control module 510 controls the virtual space 11 provided to the user 5. The virtual space definition module 1424 defines the virtual space 11. More specifically, the virtual space definition module 1424 defines the size, shape, and the like of the virtual space 11 to generate the virtual space 11.

The virtual object generation module 1425 generates objects to be arranged in the virtual space 11. The objects may include, for example, forests, mountains, other landscapes, and animals to be arranged in accordance with the progression of the story of the game.

The operation object control module 1426 arranges, in the virtual space 11, an operation object for receiving an operation of the user 5 in the virtual space 11. The user operates the operation object to operate an object arranged in the virtual space 11, for example. In at least one aspect, the operation object control module 1426 controls the operation object based on the output of the motion sensor 420. In at least one aspect, the operation object is, for example, a hand object corresponding to the hand of the user 5 wearing the HMD 120. As an example, the computer 200 receives an operation on another object in accordance with contact between the hand object and another object.

The avatar control module 1427 generates data for arranging an avatar object of the user of another computer 200, which is connected via the network, in the virtual space 11. In at least one aspect, the avatar control module 1427 generates data for arranging an avatar object of the user 5 in the virtual space 11. In at least one aspect, the avatar control module 1427 generates an avatar object simulating the user 5 based on an image of the user 5. In at least one aspect, the avatar control module 1427 generates data for arranging in the virtual space 11 an avatar object that is selected by the user 5 from among a plurality of types of avatar objects (e.g., objects simulating animals or objects of deformed humans).

The avatar control module 1427 translates the motion of the HMD 120 detected by the HMD sensor 410 in the avatar object. For example, the avatar control module 1427 detects that the HMD 120 has been inclined, and generates data for arranging the avatar object in an inclined manner. In at least one aspect, the avatar control module 1427 translates the motion of the controller 300 in the avatar object based on the output of the motion sensor 420.

The space information 1431 stores one or more templates that are defined to provide the virtual space 11.

The object information 1432 stores the panorama image 13 to be developed in the virtual space 11, an object to be arranged in the virtual space 11, and information (e.g., position information) for arranging the object in the virtual space 11.

The user information 1433 stores a program for causing the computer 200 to function as a control apparatus for the system 100, application programs using various types of content stored in the object information 1432, and the like. The user information 1433 may include a user ID (e.g., IP (Internet Protocol) address, MAC (Media Access Control) address set in the computer 200) for identifying the user 5.

The captured image DB 1434 manages the images (photographed images) generated by the automatic camera control module 1428.

[Avatar Object]

An avatar object in at least one embodiment is now described with reference to FIG. 15.

Figure 15:
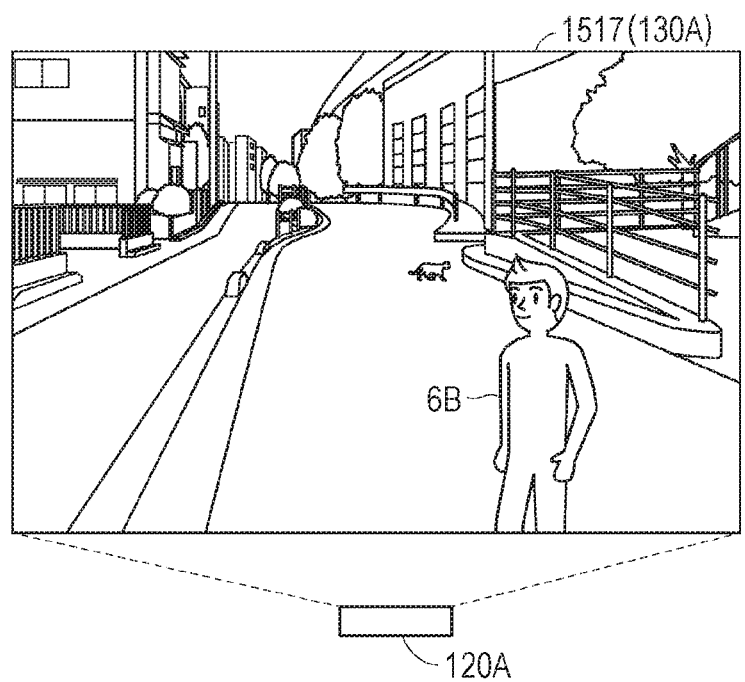
FIG. 15 A diagram of a field-of-view image to be visually recognized by the user according to at least one embodiment of this disclosure.

FIG. 15 is a diagram of a field-of-view image 1517 to be visually recognized by the user 5A in FIG. 12A according to at least one embodiment of this disclosure. The field-of-view image 1517 is an image to be displayed on the monitor 130A of the HMD 120A. This field-of-view image 1517 is an image to be captured by the virtual camera 14A. In FIG. 15, a panorama image 13 of a city scene in the real space is developed in the virtual space 11A. In the field-of-view image 1517, the avatar object 6B of the user 5B is displayed. In at least one embodiment, the city scene and the avatar object 6A of the user 5A are also displayed in the field-of-view image of the user 5B in the same manner.

Under the state of FIG. 15, the user 5A is able to communicate to/from the user 5B through conversation. More specifically, voice of the user 5A acquired by a microphone 170A is transmitted to the HMD 120B of the user 5B via the server 600 and output from a speaker 180B provided on the HMD 120B. Voice of the user 5B is transmitted to the HMD 120A of the user 5A via the server 600, and output from a speaker 180A provided on the HMD 120A.

As described above, a motion of the user 5B (motion of HMD 120B and motion of controller 300B) is translated in the avatar object 6B by the avatar control module 1427. With this, the user 5A is able to recognize the motion of the user 5B through the avatar object 6B.

In this way, the user 5A and the user 5B can communicate while sharing the same panorama image 13 in the virtual space. This panorama image 13 may include, for example, a movie, a live image, an image of a sightseeing spot, and an image photographed by the user in the past.

[Control Structure of Server 600]

Figure 16:
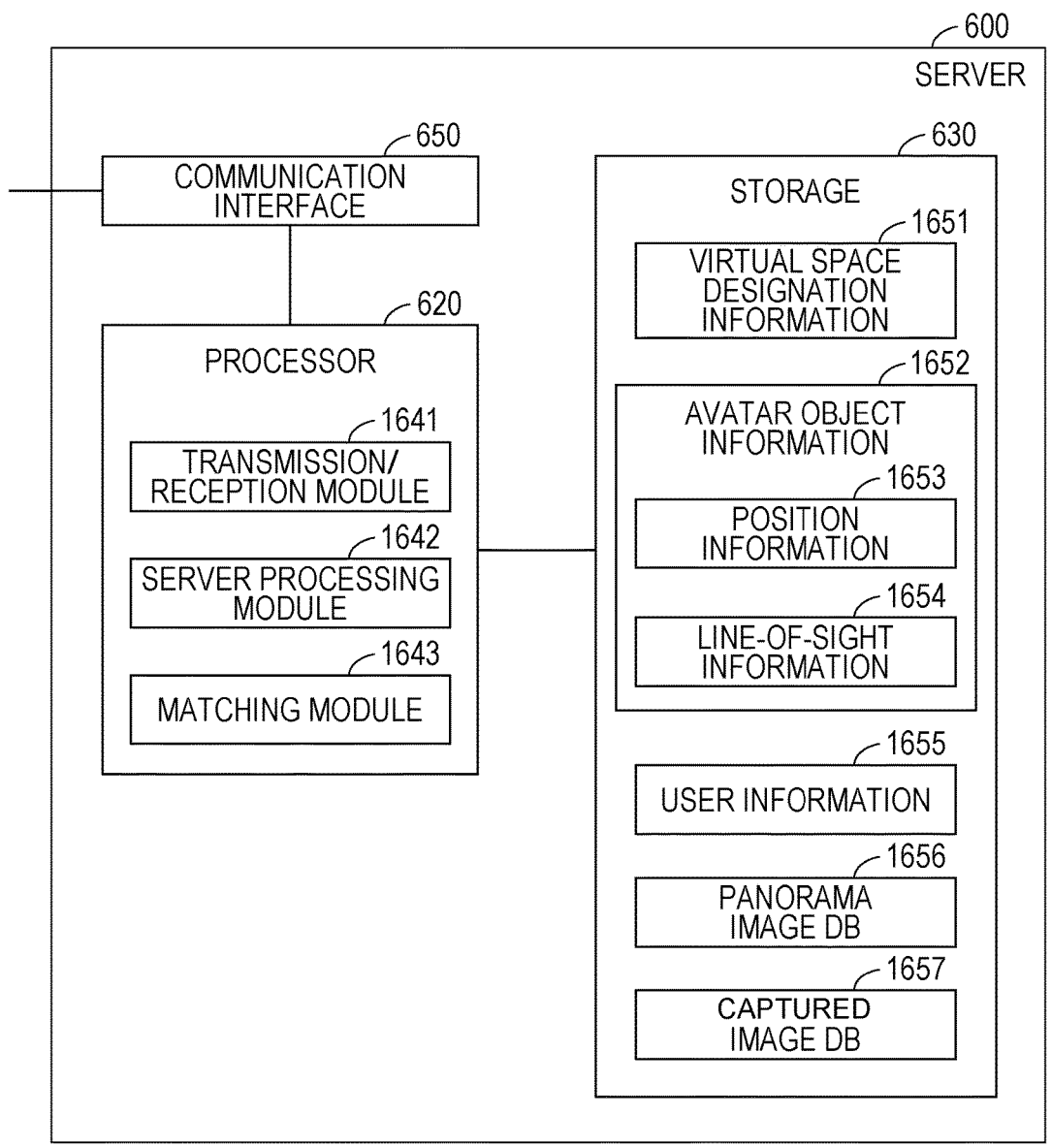
FIG. 16 A diagram of a hardware configuration and a module configuration of the server according to at least one embodiment of this disclosure.

FIG. 16 is a diagram of an example of a hardware configuration and a module configuration of the server 600 according to at least one embodiment of this disclosure. In at least one embodiment of this disclosure, the server 600 includes, as primary components, the communication interface 650, the processor 610, and the storage 630.

The communication interface 650 functions as a communication module for wireless communication, which is configured to perform, for example, modulation/demodulation processing for transmitting/receiving signals to/from an external communication device, for example, the computer 200. The communication interface 650 is implemented by, for example, a tuner or a high frequency circuit.

The processor 610 controls operation of the server 600. The processor 610 executes various control programs stored in the storage 630 to function as a transmission/reception module 1641, a server processing module 1642, and a matching module 1643.

The transmission/reception module 1641 transmits/receives various kinds of information to/from each computer 200. For example, the transmission/reception module 1641 transmits to each computer 200 the information for each computer 200 to define the virtual space 11, the panorama image 13 to be developed in the virtual space 11, the sound of the user, and the like.

The server processing module 1642 performs processing required for a plurality of users to share the same virtual space 11. For example, the server processing module 1642 updates avatar object information 1652 described later based on the information received from the computer 200.

The matching module 1643 performs a series of processing steps for associating a plurality of users with one another. For example, when a plurality of users have performed an input operation for sharing the virtual space, the matching module 1643 performs processing for associating the user IDs of those users with each other.

The storage 630 stores virtual space designation information 1651, the avatar object information 1652, user information 1655, a panorama image database (DB) 1656, and a captured image DB 1657.

The virtual space designation information 1651 is information to be used by the virtual space definition module 1424 of the computer 200 to define the virtual space 11. For example, the virtual space designation information 1651 includes information for designating the size and shape of the virtual space 11. In at least one aspect, the virtual space designation information 1651 includes identification information on one or more templates stored by the computer 200 as the space information 1431.

The avatar object information 1652 includes position information 1653 and line-of-sight information 1654. The position information 1653 represents the position (coordinates) of each avatar object in the virtual space 11. The line-of-sight information 1654 represents the inclination of each avatar object in the virtual space 11. The inclination of the avatar object is the inclination (reference line-of-sight 16) of the virtual camera 14. The inclination of the avatar object is hereinafter also referred to as "line-of-sight direction of the avatar object". The avatar object information 1652 may be updated based on information input from the computer 200 as required.

The user information 1655 is information on the user 5 of the computer 200. The user information 1655 includes, for example, user IDs for identifying a plurality of users 5.

The panorama image DB 1656 stores a plurality of panorama images 13 to be developed by the computer 200 in the virtual space 11. The photographed image DB 1657 includes information to be stored in the captured image DB 1434 of each computer 200.

[Communication Processing Via Virtual Space]

Figure 17:
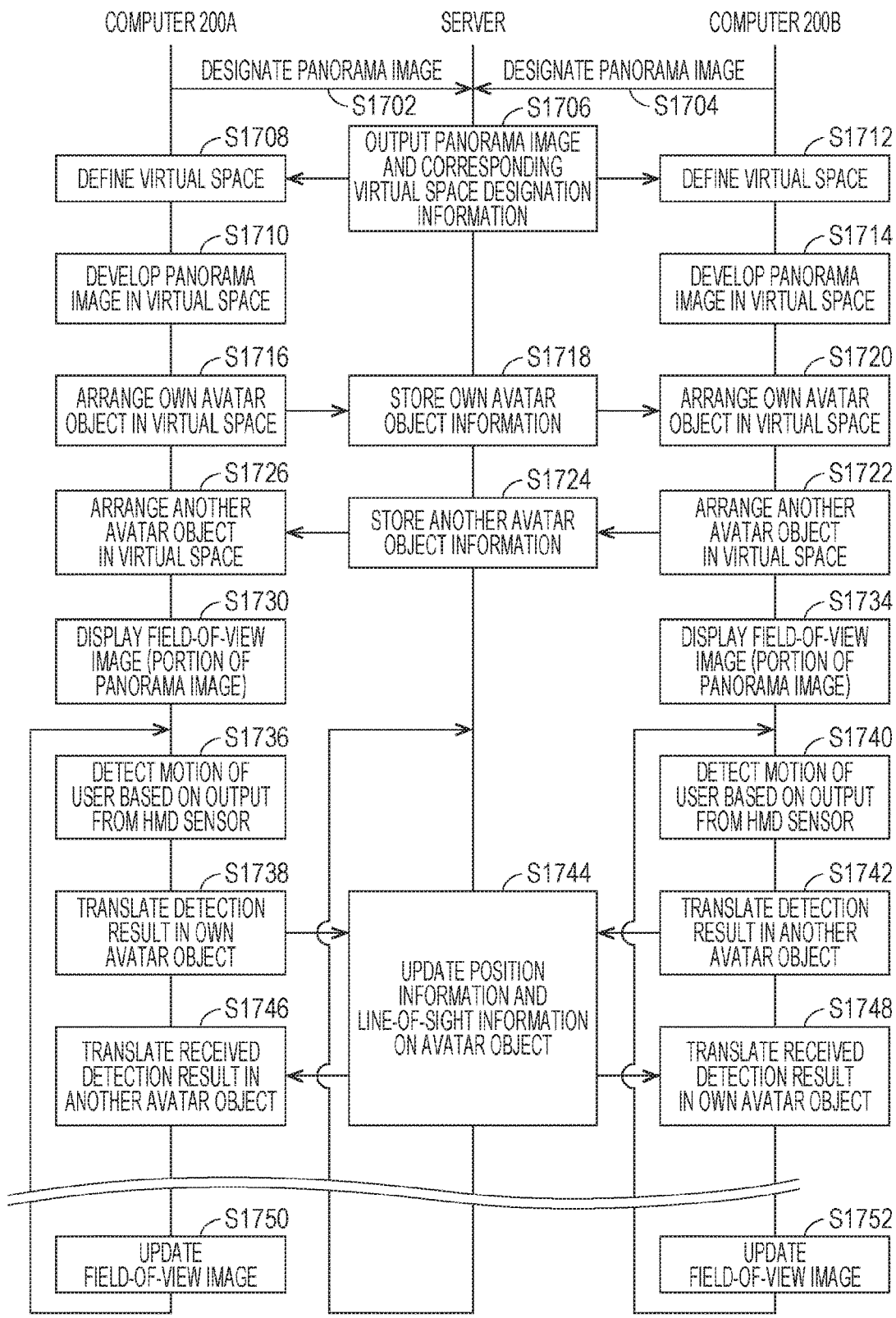
FIG. 17 A flowchart of processing in which the user of a computer and a user of another computer communicate via a virtual space according to at least one embodiment of this disclosure.

FIG. 17 is a flowchart of processing in which the user 5A of the computer 200A and the user 5B of the computer 200B communicate via a virtual space according to at least one embodiment of this disclosure.

In Step S1702, the processor 210A of the computer 200A designates, in the server 600, the panorama image 13 to be developed in the virtual space 11A. In Step S1704, the processor 210B of the computer 200B designates, in the server 600, the panorama image 13 to be developed in the virtual space 11B. In Step S1702 and Step S1704, the computers 200A and 200B may each output to the server 600 an instruction for sharing the virtual space 11 with each other.

In Step S1706, the processor 610 of the server 600 serves as the transmission/reception module 1641 to transmit the designated panorama image 13 and the virtual space designation information 1651 corresponding to the panorama image 13 to the computers 200A and 200B. Then, the processor 610 may serve as the matching module 1643 to associate the user IDs of the users 5A and 5B with each other to establish the fact that the users 5A and 5B share the same virtual space.

In Step S1708, the processor 210A serves as the virtual space definition module 1424A to define the virtual space 11A based on the received virtual space designation information 1651. In Step S1710, the processor 210A develops the received panorama image 13 in the virtual space 11A.

In Step S1712, the processor 210B serves as the virtual space definition module 1424B to define the virtual space 11B based on the received virtual space designation information 1651. In Step S1714, the processor 210B develops the received panorama image 13 in the virtual space 11B.

In Step S1716, the processor 210A serves as the avatar control module 1427A to arrange the avatar object 6A (denoted by "own avatar object" in FIG. 17) of the user 5A himself or herself in the virtual space 11A. Then, the processor 210A transmits information (e.g., data for modeling and positional information) on the avatar object 6A to the server 600.

In Step S1718, the processor 610 stores the received information on the avatar object 6A into the storage 630 (avatar object information 1652). The processor 610 further transmits the information on the avatar object 6A to the computer 200B communicating to/from the computer 200A.

In Step S1720, the processor 210B serves as the avatar control module 1427B to arrange the avatar object 6A in the virtual space 11B based on the received information on the avatar object 6A.

In the same manner as in Step S1716 to Step S1720, in Step S1722 to Step S1726, the avatar object 6B is generated in the virtual spaces 11A and 11B (denoted by "another avatar object" in FIG. 17), and information on the avatar object 6B is stored in the storage 630.

In Step S1730, the processor 210A serves as the field-of-view image generation module 1438 to display on the monitor 130A of the HMD 120A a field-of-view image (part of panorama image 13) 17A captured by the virtual camera 14A. As a result, the user 5A visually recognizes the virtual space 11A. At this time, the virtual camera control module 1421A may arrange the virtual camera 14A at the eye position of the avatar object 6A.

In Step S1734, in the same manner as the processor 210A, the processor 210B also displays on the monitor 130B a field-of-view image 17B captured by the virtual camera 14B.

In Step S1736, the processor 210A detects the motion of the user 5A. As an example, the processor 210A detects the position and the inclination of the HMD 120A based on the output of the HMD sensor 410.

In Step S1738, the processor 210A serves as the avatar control module 1427A to translate the detection result representing the motion of the user 5A in the avatar object 6A. More specifically, the processor 210A updates the position of the avatar object 6A based on the detected position of the HMD 120A, and updates the inclination (line-of-sight direction) of the avatar object 6A based on the detected inclination of the HMD 120A. The processor 210A also transmits the detection result to the server 600.

In Step S1740 and Step S1742, in the same manner as the processor 210A, the processor 210B translates the detection result representing the motion of the user 5B in the avatar object 6B. In Step S1742, the processor 210B also transmits the detection result to the server 600.

In Step S1744, the processor 610 serves as the server processing module 1642 to update the avatar object information 1652. More specifically, the processor 610 updates the position information 1653 and the line-of-sight information 1654 corresponding to the avatar object 6A based on the detection result received from the computer 200A. The processor 610 also updates the position information 1653 and the line-of-sight information 1654 corresponding to the avatar object 6B based on the detection result received from the computer 200B.

In Step S1744, the processor 610 serves as the transmission/reception module 1641 to also transmit the position information 1653 and the line-of-sight information 1654 corresponding to the avatar object 6A to the computer 200B. The processor 610 transmits the position information 1653 and the line-of-sight information 1654 corresponding to the avatar object 6B to the computer 200A.

In Step S1746, the processor 210A serves as the avatar control module 1427A to translate the received information in the avatar object 6B. In Step S1748, the processor 210B serves as the avatar control module 1427B to translate the received information in the avatar object 6A.

In Step S1750, the processor 210A displays, on the monitor 130A, a field-of-view image captured by the virtual camera 14A. As a result, a field-of-view image visually recognized by the user 5A is updated. After that, the processor 210A returns the processing to Step S1736.

In Step S1752, in the same manner as the processor 210A, the processor 210B displays a field-of-view image captured by the virtual camera 14B on the monitor 130B. As a result, a field-of-view image visually recognized by the user 5B is updated. After that, the processor 210B returns the processing to Step S1740.

In at least one embodiment of this disclosure, the processing of Step S1736 to Step S1752 is executed repeatedly at an interval, e.g., 1/60 seconds or 1/30 seconds. In at least one embodiment, the interval is adjustable by the user.

In at least one aspect, the above-mentioned repeatedly executed processing includes processing for enhancing communication between users in the virtual space 11, for example, processing for transmitting to/from the user 5A and the user 5B voice signals of the user 5A and the user 5B.

In the example described above, in Step S1716 and Step S1722, the computer 200 arranges the own avatar object 6 of the user of the computer 200 in the virtual space 11. In at least one aspect, this processing is omitted. The reason why the processing is omitted is because communication to/from a partner is possible as long as the avatar object of the partner is arranged in the virtual space 11.

[Automatic Photography]

Figure 18:
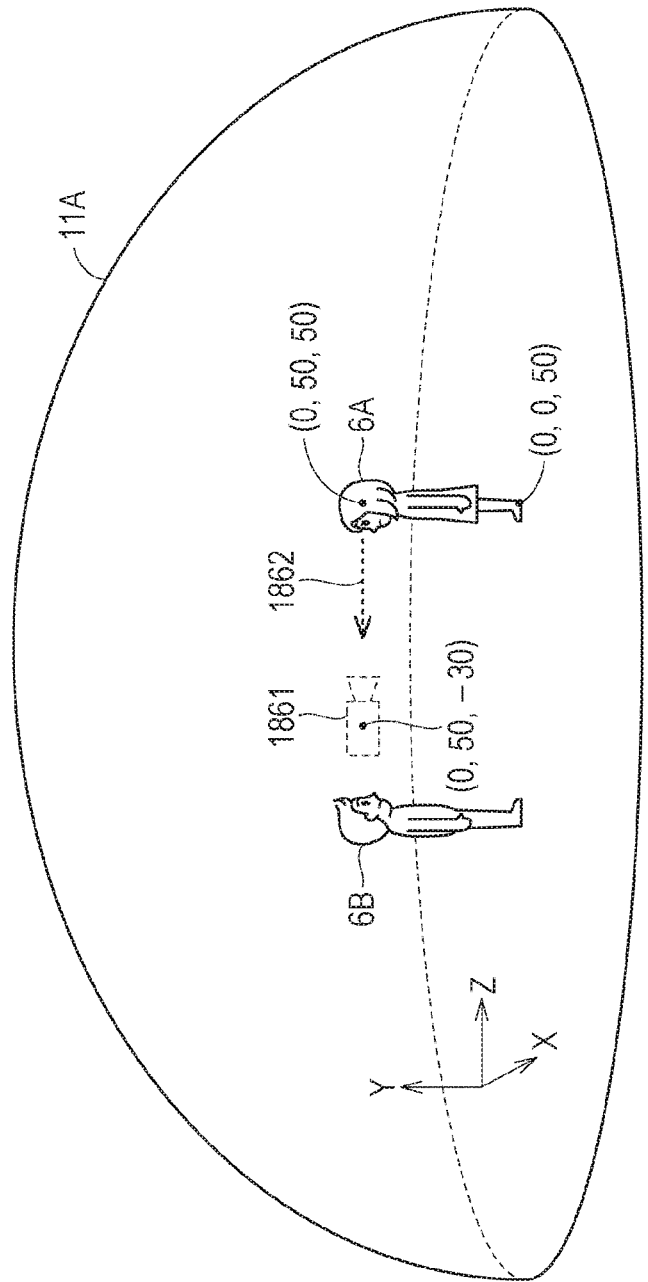
FIG. 18 A diagram of image processing in the virtual space according to at least one embodiment of this disclosure.
Figure 19:
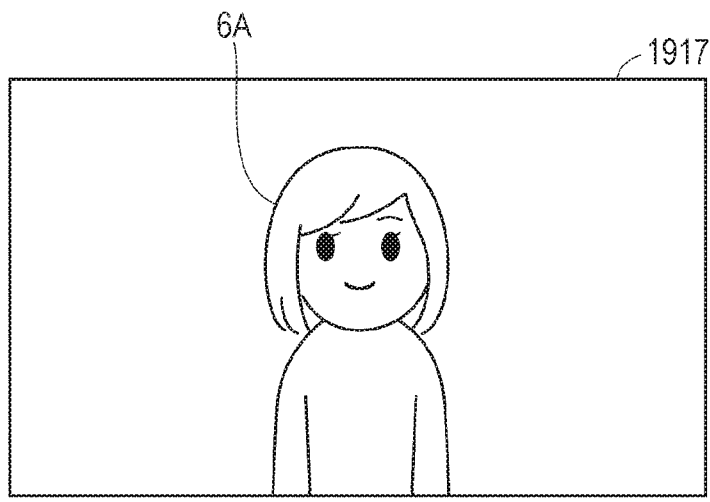
FIG. 19 A diagram of an image captured by an automatic camera according to at least one embodiment of this disclosure.

FIG. 18 is a diagram of image processing in the virtual space 11A according to at least one embodiment of this disclosure. FIG. 19 is a diagram of an image 1917 captured by the automatic camera 1861 of FIG. 18 according to at least one embodiment of this disclosure. Referring to FIG. 18, the avatar object 6A corresponding to the user 5A, the avatar object 6B corresponding to the user 5B, and the automatic camera 1861 are arranged in virtual space 11A.

The automatic camera control module 1428A arranges the automatic camera 1861 in the virtual space 11A. The automatic camera 1861 is configured so as to be capable of photographing the virtual space 11A. The images photographed by the automatic camera 1861 are stored in the storage 230A.

The automatic camera control module 1428A executes photography by the automatic camera 1861 based on the sound signal corresponding to the utterance of the user 5A acquired by the microphone 170A acting as a trigger. In at least one aspect, the automatic camera control module 1428A executes photography by the automatic camera 1861 when the acquired sound signal is equal to or higher than a first level (e.g., 70 dB) determined in advance.

In at least one aspect, the automatic camera control module 1428A arranges the automatic camera 1861 so as to photograph at least a part of the avatar object 6A based on the position information (coordinates in virtual space 11A) on the avatar object 6A.

As an example, the automatic camera control module 1428A arranges the automatic camera 1861 so that the photography direction of the automatic camera 1861 passes through the position of the avatar object 6A. With this configuration, the avatar object 6A appears at the center of the angle of view of the automatic camera 1861.

In at least one aspect, the automatic camera control module 1428A arranges the automatic camera 1861 so as to photograph the face of the avatar object 6A based on the position information and the line-of-sight direction of the avatar object 6A. The line-of-sight direction of the avatar object 6A corresponds to the inclination of the virtual camera 14A set by the virtual camera control module 1421A.

The above-mentioned processing is now described by using the example in FIG. 18. The avatar object 6A is arranged at (X, Y, Z)=(0, 0, 50) of the virtual space 11A. A line-of-sight direction 1862 of the avatar object 6A is set in the −Z direction. The automatic camera control module 1428A identifies that the face of the avatar object 6A is positioned at (X, Y, Z)=(0, 50, 50) from this arrangement position and modeling information on the avatar object 6A. The automatic camera control module 1428A arranges the automatic camera 1861 at a position (0, 50, −30) apart from the position of the face of the avatar object 6A by a predetermined distance (e.g., 80 pixels) in the line-of-sight direction 1862. The automatic camera control module 1428A also sets the direction (image capturing direction) of the automatic camera 1861 in a direction (Z-direction) opposite to the line-of-sight direction 1862. With this configuration, the automatic camera 1861 may capture an image of the face of the avatar object 6A in a manner like the image 1917 in FIG. 19.

The processor 210A stores the image 1917 generated by the automatic camera 1861 in the captured image DB 1434A. At this time, the processor 210A stores the image in association with predetermined information. The predetermined information may include a panorama image ID for identifying the panorama image 13 developed in the virtual space 11A at the time of capture, a captured image position at which the image capturing direction of the automatic camera 1861 and the celestial sphere of the virtual space 11A intersect, and a viewpoint position of the user 5A at the time of capture. In at least one aspect, the viewpoint position is the position at which the reference line-of-sight 16A (direction of virtual camera 14A) and the celestial sphere of the virtual space 11A intersect. In at least one aspect, the viewpoint position is the position at which the line of sight of the user 5A detected by the eye gaze sensor 140A and the celestial sphere of the virtual space 11A intersect.

When the panorama image 13 is a moving image, the predetermined information may include playback information indicating a timing at which the panorama image 13 is captured. In at least one aspect, the processor 210A transmits the information stored in the captured image DB 1434 to the server 600 together with the user ID of the user 5A. The server 600 stores the received information in the captured image DB 1657.

In at least one aspect, the automatic camera control module 1428A arranges a transparent automatic camera 1861, which cannot be visually recognized by the user 5A. The reason for this is that, if the user 5A can visually recognize the automatic camera 1861, the user 5A may not be able to concentrate on communication to/from the user 5B because the avatar object 6B is hidden by the automatic camera 1861, for example.

[Control Structure of Automatic Photography]

Figure 20:
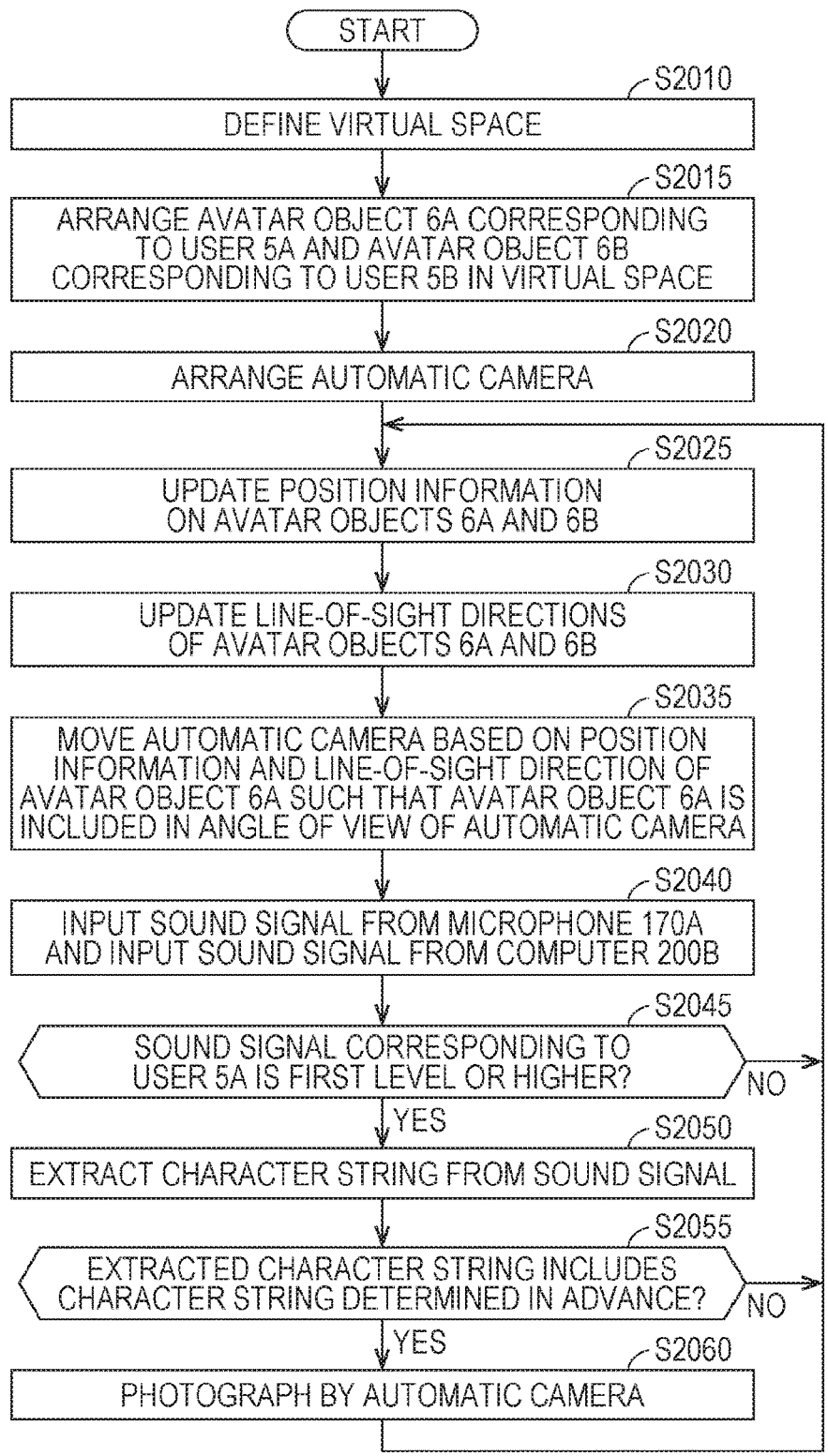
FIG. 20 A flowchart of automatic image processing to be executed by a computer according to at least one embodiment of this disclosure.

FIG. 20 is a flowchart of automatic image processing to be executed by the computer 200A according to at least one embodiment of this disclosure.

In Step S2010, the processor 210A defines the virtual space 11A based on the virtual space designation information 1651 received from the server 600.

In Step S2015, the processor 210A serves as the avatar control module 1427A to arrange the avatar object 6A corresponding to the user 5A in the virtual space 11A. The processor 210A also arranges the avatar object 6B corresponding to the user 5B based on the information received from the computer 200B.

In Step S2020, the processor 210A serves as the automatic camera control module 1428A to arrange the automatic camera 1861 in the virtual space 11A.

In Step S2025, the processor 210A serves as the avatar control module 1427A to update the position information on the avatar objects 6A and 6B. In Step S2030, the processor 210A serves as the avatar control module 1427A to update the line-of-sight direction (inclination) of the avatar objects 6A and 6B. Those steps correspond to the processing of Step S1738 and Step S1746 of FIG. 17.

In Step S2035, the processor 210A arranges the automatic camera 1861 based on the position information and the line-of-sight direction of the avatar object 6A. More specifically, the processor 210A moves the automatic camera 1861 such that at least a part (e.g., face) of the avatar object 6A is included in the angle of view of the automatic camera 1861.

In Step S2040, the processor 210A receives input of a sound signal from the microphone 170A. The processor 210A also receives input of a sound signal acquired by the microphone 170B from the computer 200B.

In Step S2045, the processor 210A determines whether or not the sound signal corresponding to the utterance of the user 5A is equal to or higher than a first level (e.g., 70 dB) determined in advance. When it is determined that the sound signal is equal to or higher than the first level (YES in Step S2045), the processor 210A advances the processing to Step S2050. When it is determined that the sound signal is not equal to or higher than the first level (NO in Step S2045), the processor 210 returns the processing to Step S2025.

In Step S2050, the processor 210A extracts a character string from the sound signal corresponding to the utterance of the user 5A. As an example, the processor 210A compares waveform data delimited at predetermined time units (e.g., in units of 10 msec) from the start of the sound signal with an acoustic model (not shown) stored in the storage 230A, and extracts a character string. The acoustic model represents a feature amount for each phoneme, such as vowels and consonants. As an example, the processor 210A compares the sound signal with the acoustic model based on the Hidden Markov model.

In Step S2055, the processor 210A determines whether or not a character string determined in advance is included in the extracted character string. As an example, the character string determined in advance includes a plurality of exclamations, such as "wow", "oh", and "eh".

When it is determined that a character string determined in advance is included in the extracted character string (YES in Step S2055), the processor 210A advances the processing to Step S2060, and executes image capturing by the automatic camera 1861. The processor 210A stores the image generated by the photography in the storage 230A. When it is determined that a character string determined in advance is not included in the extracted character string (NO in Step S2055), the processor 210A returns the processing to Step S2025.

As a result of the processing described above, rather than the image capturing operation by the user 5A (e.g., operation using the controller 300A) acting as a trigger, the computer 200A automatically capture an image of the virtual space 11A based on the sound of the user 5A acting as a trigger. Thus, the computer 200A may appropriately execute image capturing at the photography timing (e.g., when user 5A emits a voice of surprise).

The computer 200A may suppress a feeling of troublesomeness involved with the image capturing operation felt by user 5A. In addition, because sound acts as a trigger, the computer 200A may increase the degree of freedom of posing by the user 5A (i.e., posing of avatar object 6A). As a result, the HMD system 100 in at least one embodiment of this disclosure may enrich the experience of the user in the virtual space.

In the example described above, the computer 200A is configured to extract a character string from the sound signal and to execute image capturing by the automatic camera 1861 when the extracted character string includes a character string determined in advance. In at least one aspect, the computer 200A is configured to estimate an emotion of the user 5A from the input sound signal, and to execute image capturing based on the estimated emotion. For example, the computer 200A extracts a character string from the sound signal, and estimates an emotion from the extracted character string. Such processing may be implemented by, for example, "Emotion Analysis API" provided by Metadata Inc. In at least one aspect, the computer 200A estimates an emotion from the waveform of the sound signal. Such processing may be implemented by, for example, "ST Emotion SDK" provided by AGI Inc. As an example, the computer 200A may also be configured to execute image capturing by the automatic camera 1861 when the emotion of the user 5A based on the sound signal is classified as a positive emotion (e.g., pleasure or happiness).

In at least one aspect, the HMD set 110A further includes a camera (e.g., infrared camera) for capturing an image of the face of the user 5A. The processor 210A may translate the facial expression of the user 5A in the avatar object based on the output of that camera. Such control may be implemented by a known face tracking technology. In such a case, the computer 200A according to the above-mentioned at least one embodiment may photograph the avatar object 6A in which the facial expression of the user 5A at the moment when the emotion of the user 5A has intensified is translated.

[Movement Control of Automatic Camera 1861]

Figure 21:
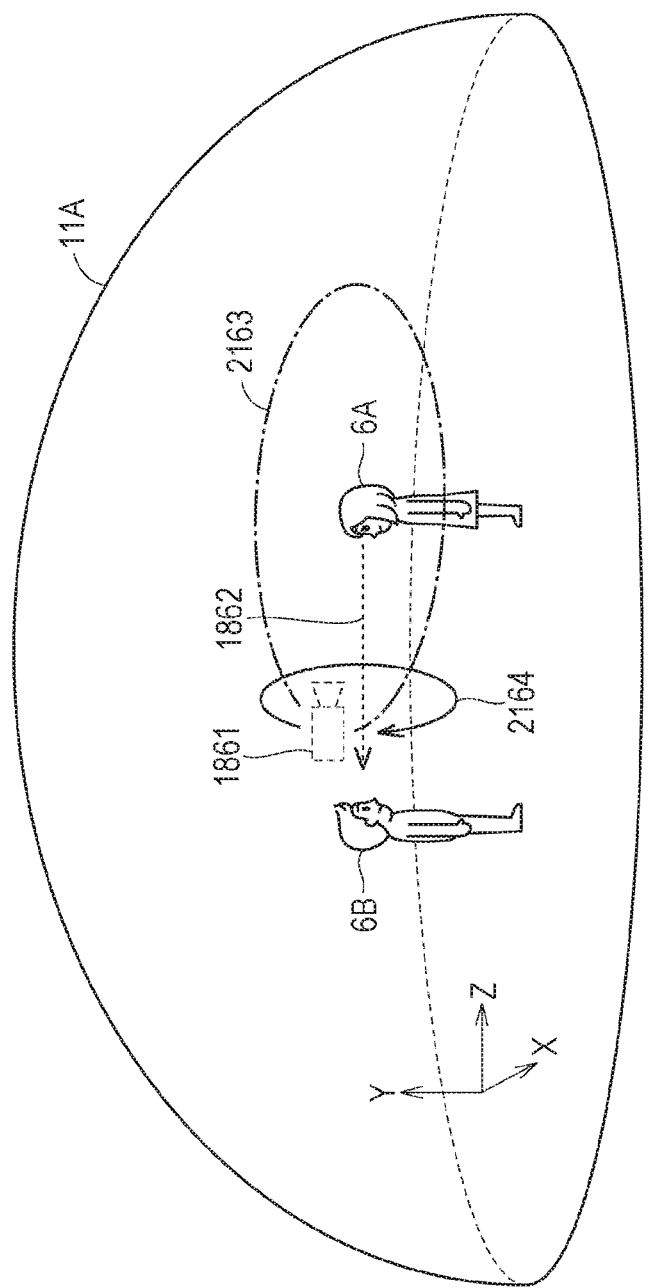
FIG. 21 A diagram of movement control of the automatic camera according to at least one embodiment of this disclosure.

FIG. 21 is a diagram of movement control of the automatic camera 1861 according to at least one aspect. The automatic camera control module 1428A may move the automatic camera 1861 in a pattern determined in advance with reference to the position of the avatar object 6A.

For example, the automatic camera control module 1428A may move the automatic camera 1861 in a circular trajectory 2163 centered around the position of the avatar object 6A (position of face). At this time, the automatic camera control module 1428A may control the movement of the automatic camera 1861 such that at least a part (e.g., face) of the avatar object 6A is included in the angle of view of the automatic camera 1861. More specifically, the automatic camera control module 1428A may control the movement of the automatic camera 1861 such that the image capturing direction of the automatic camera 1861 passes through the position of the avatar object 6.

As a result of the configuration described above, the automatic camera 1861 can capture an image of the avatar object 6A from various angles.

In at least one embodiment, the automatic camera control module 1428A may move the automatic camera 1861 in a circular trajectory 2164 formed on a plane orthogonal to the line-of-sight direction 1862 centered around a certain point on the line-of-sight direction 1862. At this time, the automatic camera control module 1428A may control the movement of the automatic camera 1861 such that at least a part (e.g., face) of the avatar object 6A is included in the angle of view of the automatic camera 1861.

As a result of the configuration described above, the automatic camera 1861 can capture an image of the face of the avatar object 6A from various angles.

[Processing for Promoting Communication]

In at least one embodiment, the processor 210A is configured to execute image capturing by the automatic camera 1861 without considering utterances from the other user 5B or avatar object 6B arranged in the virtual space 11A. In the following, there is described processing for promoting communication between the users in which the utterances of the other user 5B or avatar object 6B are taken into consideration.

(Case in which Avatar Objects are Facing Each Other)

Figure 22:
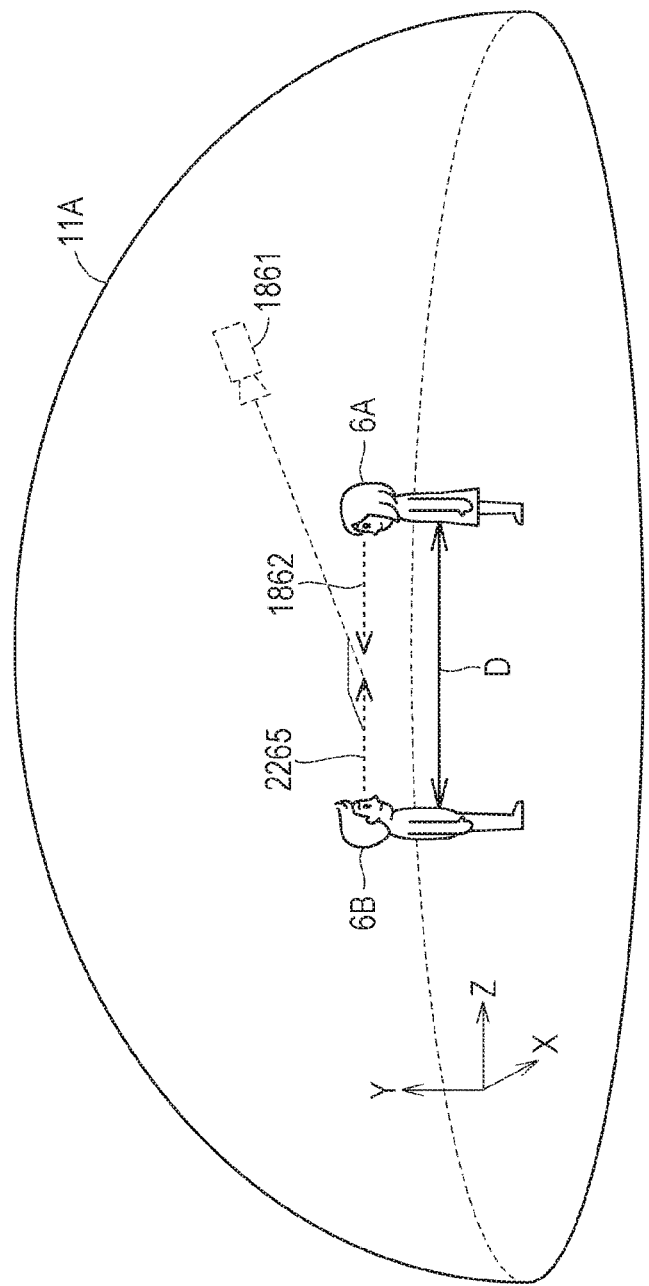
FIG. 22 A diagram of image processing to be executed by an automatic camera control module in which an avatar object is taken into consideration according to at least one embodiment of this disclosure.
Figure 23:
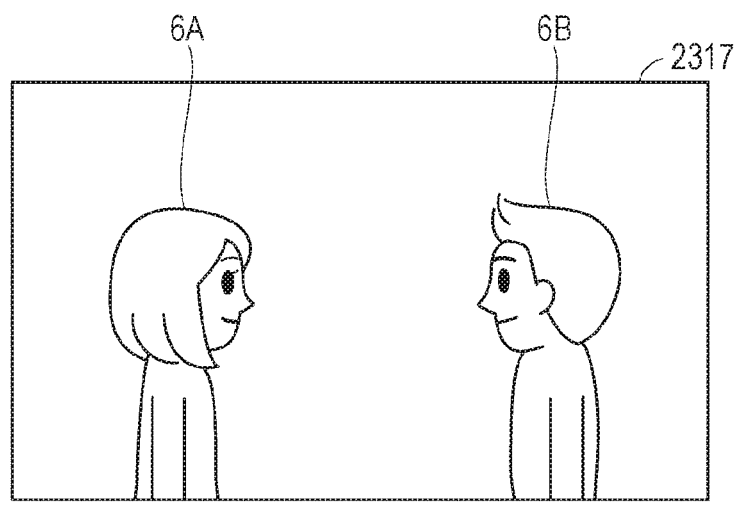
FIG. 23 A diagram of an image generated by the automatic camera according to at least one embodiment of this disclosure.

FIG. 22 is a diagram of image processing to be executed by the automatic camera control module 1428A in which the avatar object 6B is taken into consideration according to at least one embodiment of this disclosure. FIG. 23 is a diagram of an image 2317 generated by the automatic camera 1861 of FIG. 22 according to at least one embodiment of this disclosure.

Referring to FIG. 22, the avatar object 6A and the avatar object 6B are arranged in the virtual space 11A to be separated by a distance D. The automatic camera control module 1428A executes image capturing by the automatic camera 1861 based on the sound signal corresponding to at least the user 5A acting as a trigger. In at least one aspect, the automatic camera control module 1428A executes image capturing by the automatic camera 1861 when the sound signal corresponding to the user 5A is equal to or higher than the first level.

In at least one aspect of this disclosure, the automatic camera control module 1428A executes image capturing based on the sound signal corresponding to the user 5A and the sound signal corresponding to the user 5B acting as triggers. As an example, the automatic camera control module 1428A executes image capturing when the sound signal corresponding to each of the users 5A and 5B is equal to or higher than a second level determined in advance. The second level may be set lower than the first level. The reason for this is because the first level is a setting for detecting an exclamation from a corresponding user, but the second level is a setting for detecting the communication (conversation) between the corresponding users.

In at least one aspect, the automatic camera control module 1428A is configured to execute image capturing when the sound signal corresponding to each of both users (users 5A and 5B) is equal to or higher than the first level. In such a case, image capturing is performed when both of the users show interest at the same timing. Therefore, there is a high likelihood that both users are interested in the subject of the captured image, and communication may become more active as a result of the image generated by the captured image.

In at least one aspect, the automatic camera control module 1428A executes image capturing by the automatic camera 1861 when the distance D is less than a predetermined distance (e.g., 100 pixels). Specifically, the automatic camera control module 1428A calculates the distance D based on the position of the avatar object 6A and the position of the avatar object 6B. In at least one aspect, the automatic camera control module 1428A may calculate the distance D based on the position of a predetermined part (e.g., face) of the avatar object 6A and the position of a predetermined part of the avatar object 6B. This further increases the likelihood of the users 5A and 5B communicating to/from each other.

In at least one aspect, the automatic camera control module 1428A executes image capturing by the automatic camera 1861 when the avatar objects 6A and 6B are facing each other.

The automatic camera control module 1428A identifies the line-of-sight direction 1862 of the avatar object 6A and a line-of-sight direction 2265 of the avatar object 6B (Step S1738 and Step S1746 of FIG. 17). In at least one embodiment, the automatic camera control module 1428A determines that the avatar objects 6A and 6B are facing each other when an angle formed by those line-of-sight directions on the XZ-plane is approximately 180 degrees (e.g., from 170 degrees to 190 degrees).

When it is determined that the above-mentioned condition is satisfied, the automatic camera control module 1428A sets the image capturing direction of the automatic camera 1861 to a direction orthogonal to the direction in which the line-of-sight directions 1862 and 2265 face each other. In at least one aspect, the automatic camera control module 1428A sets the image capturing direction of the automatic camera 1861 to a direction orthogonal to the line-of-sight direction 1862.

At this time, the automatic camera control module 1428A arranges, based on the position information on the avatar objects 6A and 6B, the automatic camera 1861 such that that at least a part of each of those avatar objects is within the angle of view of the automatic camera 1861. As an example, the automatic camera control module 1428A arranges the automatic camera 1861 such that the faces of the avatar objects 6A and 6B are included in the angle of view of the automatic camera 1861.

With the above-mentioned configuration, the computer 200A can generate the image 2317 including the avatar objects 6A and 6B as in FIG. 23. The user 5A is able to promote communication to/from the user 5B in the virtual space 11A by discussing the image 2317 as a topic. In at least one aspect, the computer 200A transmits the image 2317 to the computer 200B. The users 5A and 5B attempt to communicate to/from each other while viewing the image 1917 together in the virtual space. As a result, communication between the users may be further promoted.

(Case in which Plurality of Users are Looking at Same Target Object)

Figure 24:
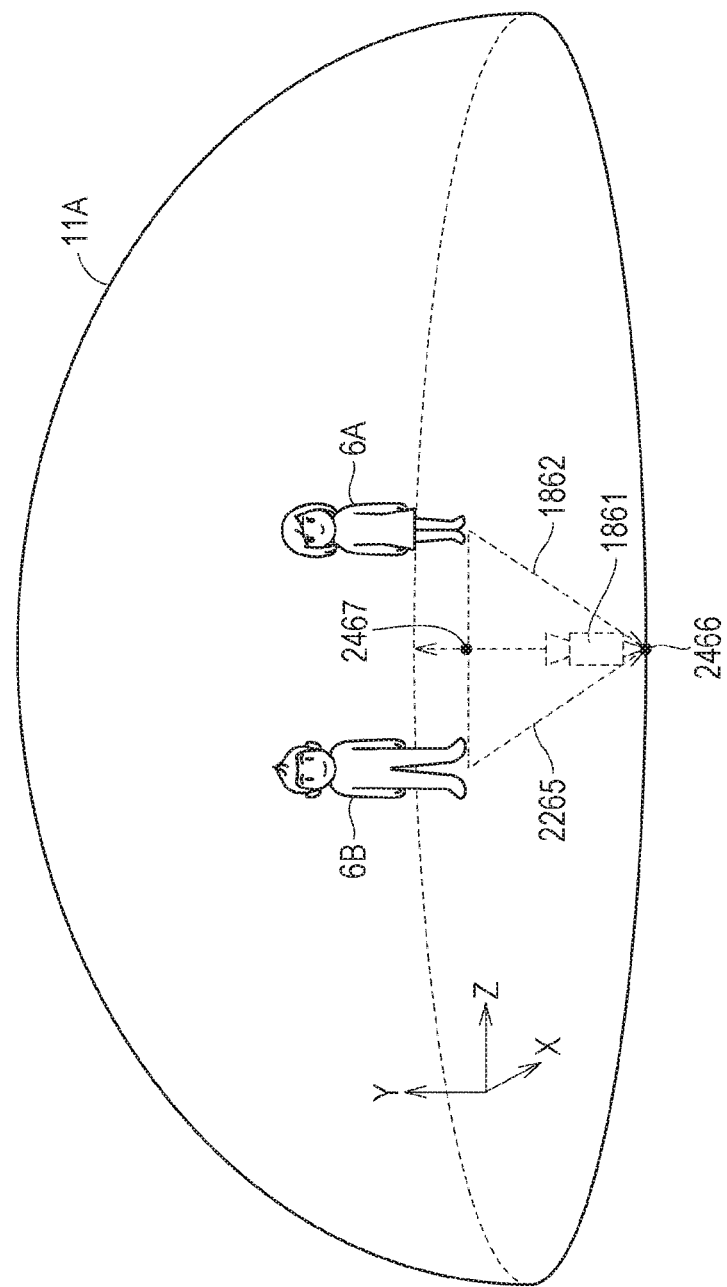
FIG. 24 A diagram of processing to be executed by an automatic camera control module when a plurality of users are looking at the same target object according to at least one embodiment of this disclosure.
Figure 25:
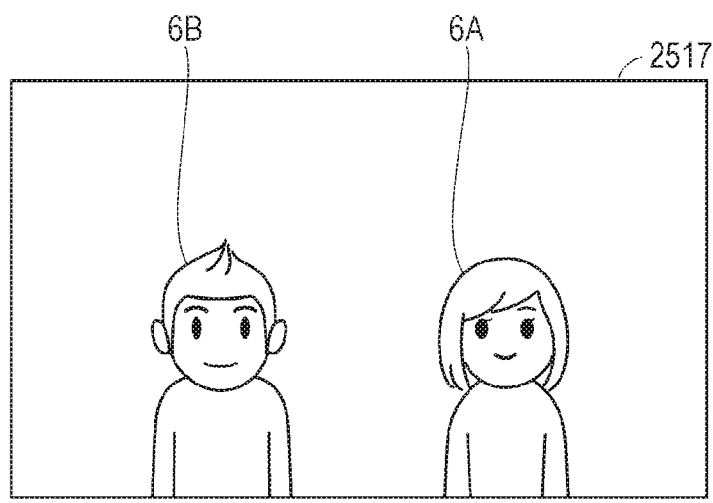
FIG. 25 A diagram of an image generated by the automatic camera according to at least one embodiment of this disclosure.

FIG. 24 is a diagram of processing to be executed by the automatic camera control module 1428A when a plurality of users are looking at the same target object according to at least one embodiment of this disclosure. FIG. 25 is a diagram of an image 2517 generated by the automatic camera 1861 of FIG. 24 according to at least one embodiment of this disclosure.

The same panorama image 13 is developed in the virtual spaces 11A and 11B. Therefore, the users 5A and 5B may communicate to/from each other while looking at the same target object (part of panorama image 13). In such a case, in FIG. 24, the line-of-sight direction 1862 of the avatar object 6A and the line-of-sight direction 2265 of the avatar object 6B are directed at substantially the same place (part of the panorama image 13).

In at least one aspect, the automatic camera control module 1428A determines that the users 5A and 5B are looking at the same target object when a distance between the position at which the line-of-sight direction 1862 passes through the celestial sphere of the virtual space 11A and the position at which the line-of-sight direction 2265 passes through the celestial sphere of the virtual space 11A is less than a distance determined in advance. The automatic camera control module 1428A executes image capturing by the automatic camera 1861 when this distance is less than the distance determined in advance. The position at which the line-of-sight direction 1862 passes through the celestial sphere of the virtual space 11A is hereinafter also referred to as "viewpoint 1862", and the position at which the line-of-sight direction 2265 passes through the celestial sphere of the virtual space 11A is hereinafter also referred to as "viewpoint 2265". The automatic camera control module 1428A may be configured to execute image capturing when a condition that the distance D between the avatar objects is less than a predetermined distance is further satisfied. The automatic camera control module 1428A may also be configured to execute image capturing when a condition relating to the sound signal corresponding to at least the user 5A is further satisfied.

The automatic camera control module 1428A arranges, in accordance with satisfaction of the above-mentioned condition, the automatic camera 1861 based on the positions of the avatar objects 6A and 6B and the line-of-sight directions 1862 and 2265.

As an example, the automatic camera control module 1428A calculates an intermediate point 2466 (coordinate values) between the viewpoints 1862 and 2265 and an intermediate point 2467 (coordinate values) between the positions of the avatar objects 6A and 6B. The automatic camera control module 1428A arranges the automatic camera 1861 on a line segment connecting the intermediate point 2466 and the intermediate point 2467. At this time, the automatic camera control module 1428A arranges the automatic camera 1861 such that that at least a part of each of the avatar objects 6A and 6B is included in the angle of view of the automatic camera 1861. As an example, the automatic camera 1861 is arranged such that the intermediate point 2467 is at the center of the angle of view.

With the above-mentioned configuration, the computer 200A can generate the image 2517 in which the avatar objects 6A and 6B face the front, as in FIG. 25.

In this case, when storing the image 2517 in the captured image DB 1434A, the processor 210A may store together with the user ID of the user 5B of the avatar object 6B, which is the subject.

In at least one aspect, the automatic camera control module 1428A arranges the automatic camera 1861 so as to capture an image of the target object in which the users 5A and 5B are looking at. As an example, the automatic camera control module 1428A arranges the automatic camera 1861 such that the intermediate point 2466 is at the center of the angle of view. With this configuration, the computer 200A may capture an image of a target object of interest to the users 5A and 5B. As a result, the user 5A is able to further promote communication to/from the user 5B by discussing the generated image as a topic.

However, in the above-mentioned control, a view of the back of the avatar objects 6A and 6B may be included in the angle of view of the automatic camera 1861, but the faces are not included. Therefore, there is now described processing that helps to resolve this issue.

Figure 26:
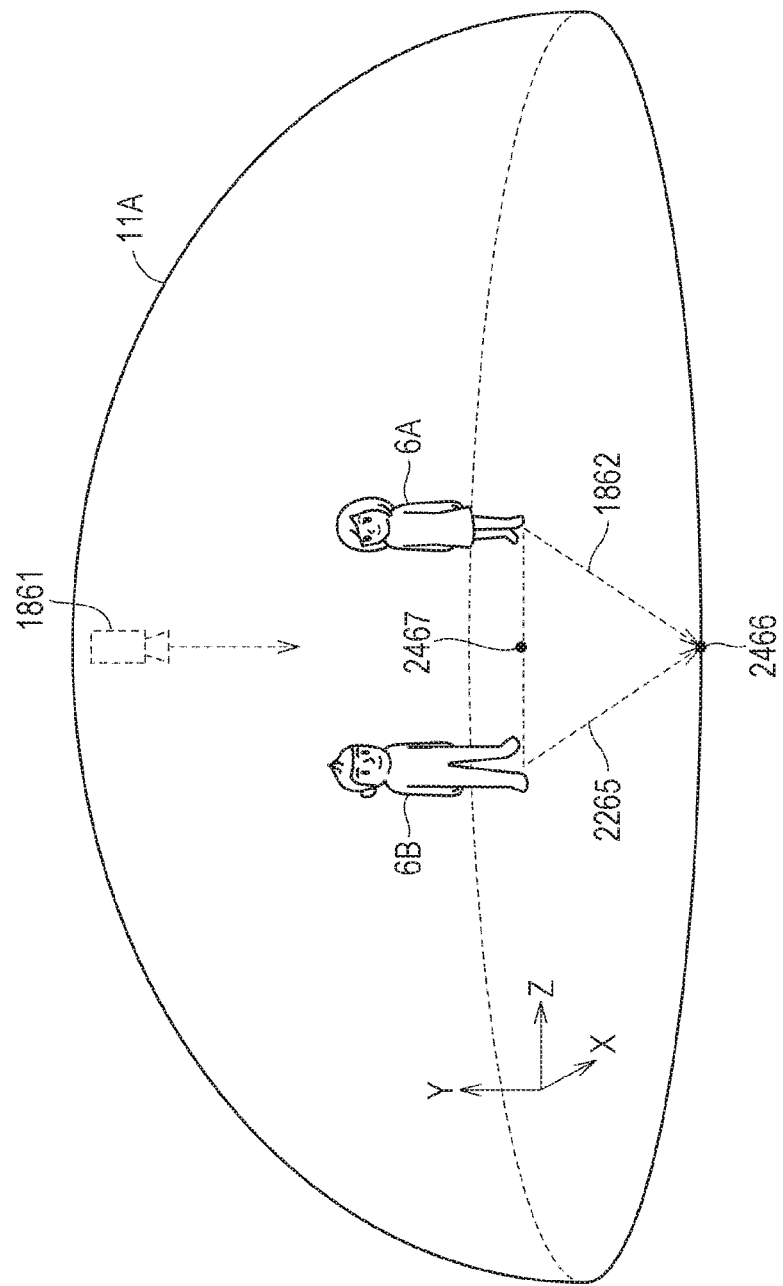
FIG. 26 A diagram of processing to be executed by the automatic camera control module when a plurality of users are looking at the same target object according to at least one embodiment of this disclosure.
Figure 27:
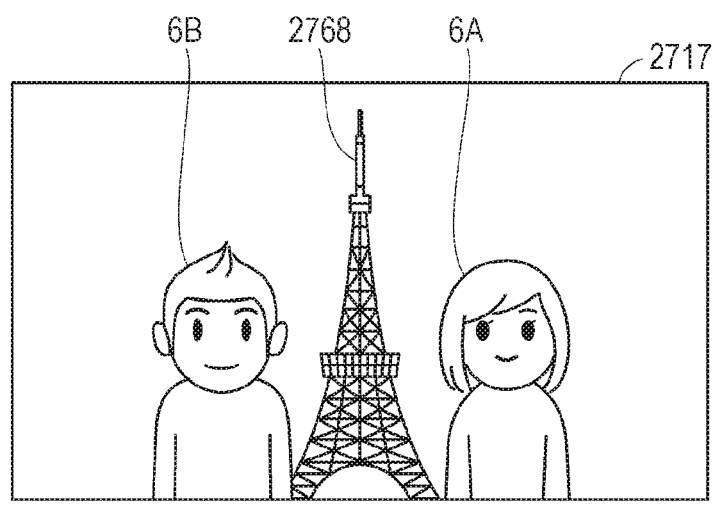
FIG. 27 A diagram of an image generated by the automatic camera according to at least one embodiment of this disclosure.

FIG. 26 is a diagram of processing to be executed by the automatic camera control module 1428A when a plurality of users are looking at the same target object according to at least one embodiment of this disclosure. FIG. 27 is a diagram of an image 2717 generated by the automatic camera 1861 of FIG. 26 according to at least one embodiment of this disclosure.

When it is determined that the distance between the viewpoints 1862 and 2265 is less than the distance determined in advance, the automatic camera control module 1428A arranges the automatic camera 1861 such that the intermediate point 1862 and the avatar objects 6A and 6B are included in the angle of view. As an example, the automatic camera control module 1428A arranges the automatic camera 1861 on a straight line connecting the intermediate point 1862 and the intermediate point 2265.

When the automatic camera 1861 photographs the avatar objects 6A and 6B in the state described above, those avatar objects included in the generated image are to be facing backward. Therefore, the automatic camera control module 1428A directs the line-of-sight direction (head direction) of each of the avatar objects 6A and 6B included in the image photographed by the automatic camera 1861 in the position of the automatic camera 1861. Specifically, the automatic camera control module 1428A generates an image of the avatar objects looking at the camera based on the modeling data on each of the avatar objects 6A and 6B.

With the above-mentioned configuration, in FIG. 27, the computer 200A is capable of generating an image 2717 including the avatar objects 6A and 6B facing the front and the target object (in the example of FIG. 27, Tokyo Tower (trademark) 2768) of interest to the users 5A and 5B. As a result, the user 5A is able to further promote communication to/from the user 5B by discussing the generated image as a topic.

In at least one aspect, the facial expressions of the users 5A and 5B are translated in the avatar objects 6A and 6B, respectively, by a known face tracking technology. In such a case, when generating the image of the avatar objects looking at the camera, the automatic camera control module 1428A generates an image in which the facial expressions of the users 5A and 5B at the photography timing are translated in the avatar objects 6A and 6B.

[Control Structure of Automatic Photography]

Figure 28:
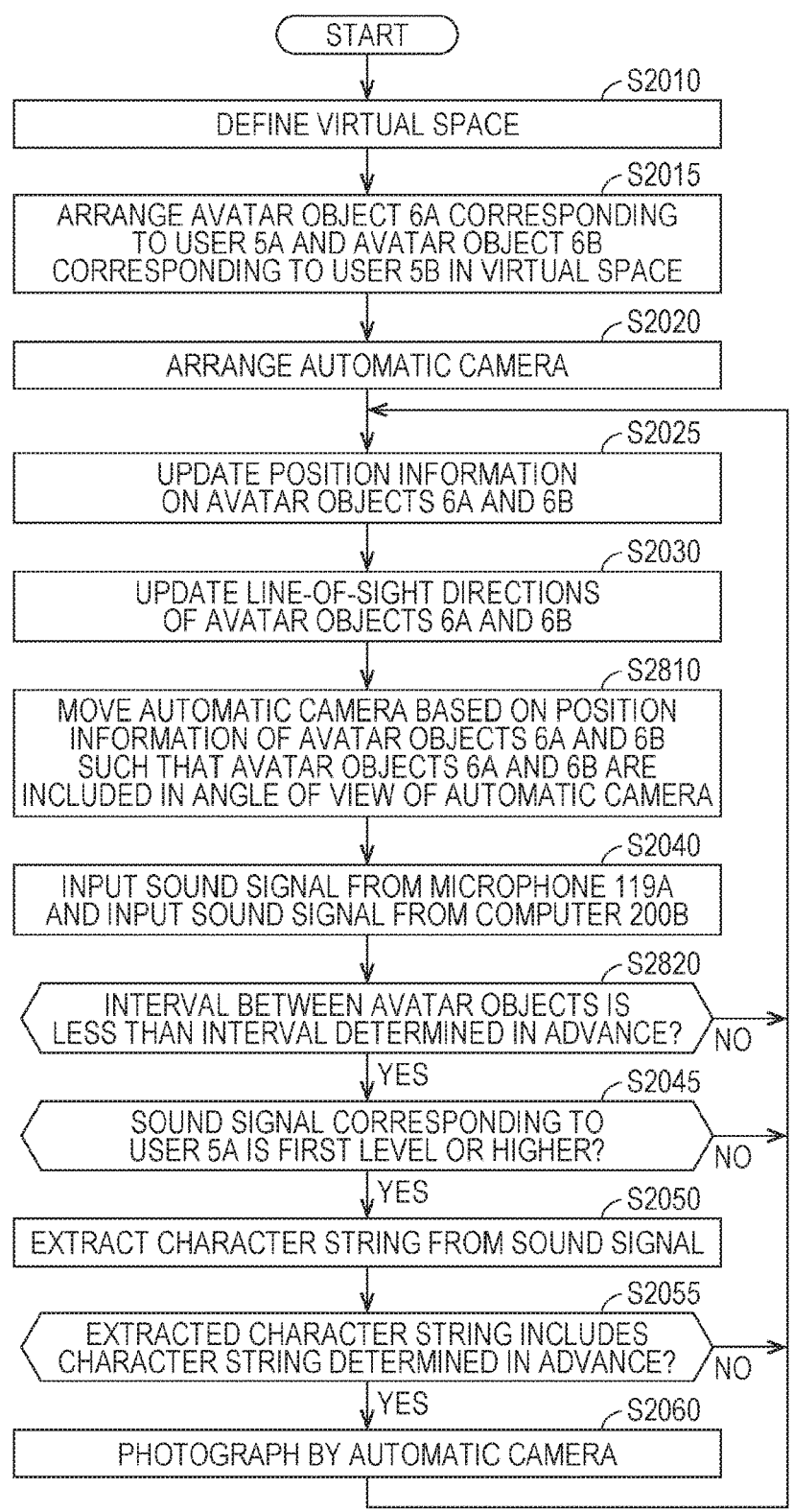
FIG. 28 A flowchart of automatic image processing to be executed by the computer in order to promote communication between the users according to at least one embodiment of this disclosure.

FIG. 28 is a flowchart of automatic photography processing to be executed by the computer 200A in order to promote communication between the users according to at least one embodiment of this disclosure. Of the processing steps in FIG. 28, the steps that are similar to those described above are denoted by using the same reference numerals, and a description of those processing steps is not repeated.

In Step S2810, the processor 210A arranges the automatic camera 1861 based on the position information on the avatar objects 6A and 6B. More specifically, the processor 210A moves the automatic camera 1861 such that at least a part (e.g., face) of each of the avatar objects 6A and 6B is included in the angle of view of the automatic camera 1861.

In Step S2820, the processor 210A determines whether the distance D between the avatar objects 6A and 6B is less than a distance determined in advance. When it is determined that the distance D is less than the distance determined in advance (YES in Step S2820), the processor 210A advances the processing to Step S2045. When it is determined that the distance D is not less than the distance determined in advance (NO in Step S2820), the processor 210A returns the processing to Step S2025.

With the above-mentioned processing, the computer 200A may provide to the user 5A an image for promoting communication to/from the user 5B.

In the processing in FIG. 28, the computer 200A is configured to execute photography based only on the sound signal corresponding to the user 5A (Step S2045 of FIG. 28). However, there may be a case in which the user 5A is unilaterally speaking to the user 5B. Therefore, in at least one aspect, the computer 200A is configured to determine that the two users are communicating to/from each other and to execute photographing when the sounds of both users are alternately input.

Figure 29:
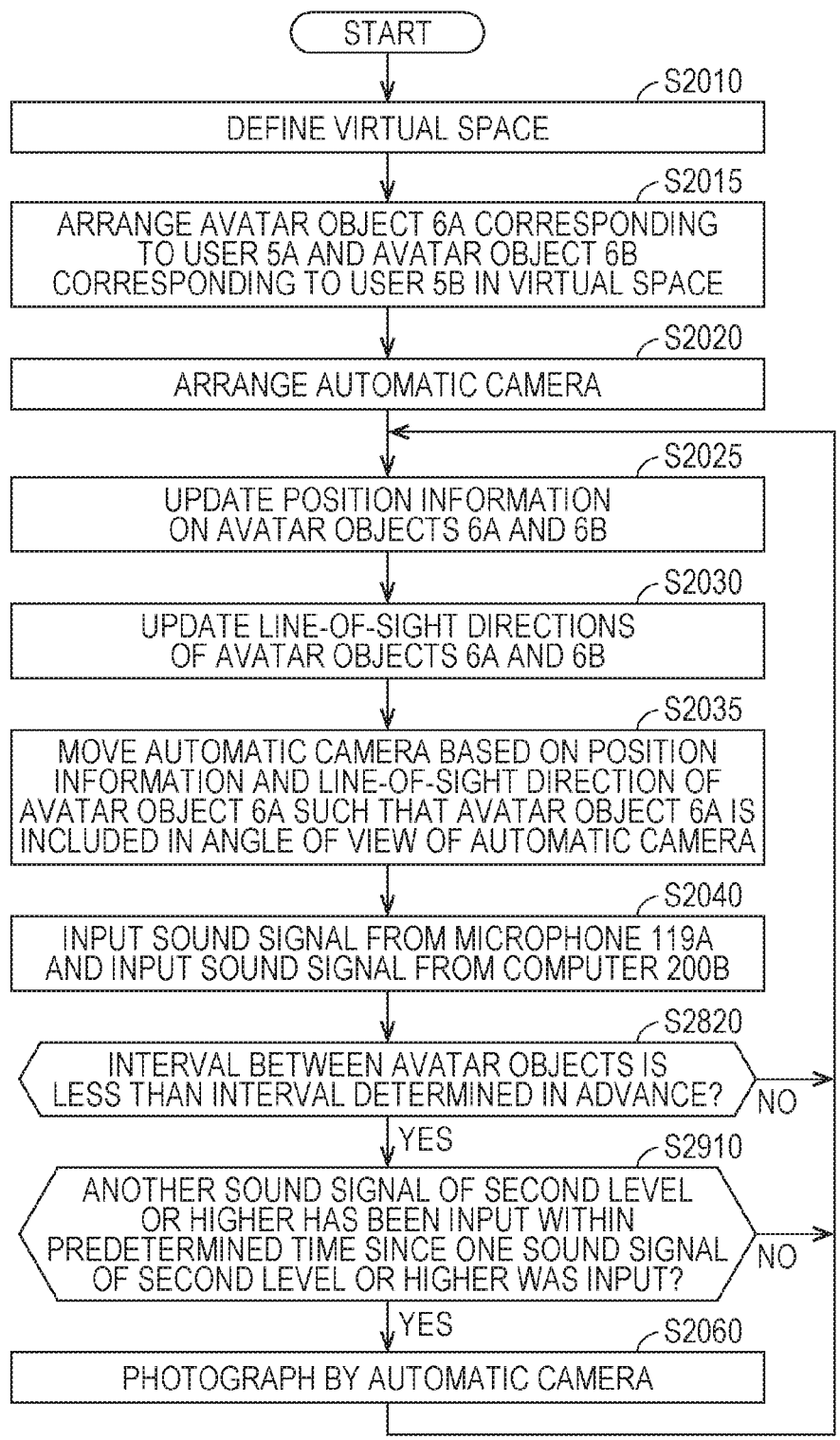
FIG. 29 A flowchart of automatic image processing for promoting communication between the users according to at least one embodiment of this disclosure.

FIG. 29 is a diagram of automatic photography processing for promoting communication between the users according to at least one aspect. Of the processing steps in FIG. 29, the steps that similar to those described above are denoted by using the same reference numerals, and a description of those processing steps is not repeated.

In Step S2820, when it is determined that the distance D between the avatar objects 6A and 6B is less than the distance determined in advance, the processor 210A advances the processing to Step S2910.

In Step S2910, the processor 210A determines whether or not, since reception of input of a sound signal equal to or higher than a second level determined in advance corresponding to one of the users 5A and 5B, input of a sound signal equal to or higher than the second level corresponding to the other of the users 5A and 5B has been received within a predetermined time. The predetermined time is set to, for example, 2 seconds.

When it is determined that the input of the sound signal of the second level or higher corresponding to the other of the users has been received within the predetermined time since reception of the input of the sound signal of the second level or higher corresponding to one of the users (YES in Step S2910), the processor 210A advances the processing to Step S2060 and executes photography. When it is determined that such input has not been received (NO in Step S2910), the processor 210A returns the processing to Step S2025.

With the above-mentioned processing, the computer 200A can execute photography when there is a high likelihood that the users 5A and 5B are talking.

[Management of Captured Image]

FIG. 30 is a table of an example of the data structure of the captured image DB 1657 according to at least one embodiment of this disclosure. In the example shown in FIG. 30, the captured image DB 1657 stores photographed images, user IDs, panorama image IDs, photographed image positions, viewpoint positions, and photography timing in association with each other. Those pieces of data are information received from each computer 200.

The user ID identifies the user 5 of the computer 200 that has generated the photographed image. The panorama image ID identifies the panorama image 13 developed in the virtual space 11 at the time of capture. The captured image position represents the position at which the image capturing direction of the automatic camera and the celestial sphere of the virtual space 11 intersect. In other words, the photographed image position represents the center position of the panorama image 13 included in the captured image. The viewpoint position represents the position at which the image capturing direction of the virtual camera 14 and the celestial sphere of the virtual space 11 intersect. The image capturing timing identifies the timing at which the panorama image 13 is captured when the panorama image 13 developed in the virtual space 11 is a moving image.

The captured image DB 1657 may store, when the captured image includes a plurality of avatar objects, the user ID corresponding to each of the avatar objects.

Each computer 200 generates a captured image based on the utterances of the user 5. This processing may also be said to be processing for generating a captured image at a timing at which each computer 200 estimates that the emotion of the user 5 has changed based on the utterance of the user 5. Therefore, the administrator of the server 600 can grasp the object to interest of the user 5 based on the captured image DB 1657.

In one at least one aspect, the processor 610 of the server 600 identifies the objects (content) to be included in a peripheral image of the viewpoint position in the panorama image 13 by a known machine learning method, and stores the identified result in the captured image DB 1657. As an example, the processor 610 uses a selective search method to identify a bounding box surrounding an object included in the peripheral image. The processor 610 calculates a feature amount derived by a convolutional neural network (CNN) from an image cut from the bounding box. The processor 610 identifies an object included in the bounding box by using the calculated feature amount and a classifier based on a plurality of support vector machines (SVM).

With the above-mentioned configuration, the administrator of the server 600 can easily understand the target (object) of interest to the user 5. The processor 610 of the server 600 may also be configured to perform, based on the identified object, processing for delivering an advertisement that the user 5 is likely to express interest in and processing for recommending a panorama image 13 that the user 5 is likely to express interest in.

[Configurations]

The technical features disclosed above are summarized in the following manner.

(Configuration 1) According to at least one embodiment of this disclosure, there is provided a method to be executed by a computer 200 in order to provide a virtual space 11 by an HMD 120. The method includes defining the virtual space 11 (Step S2010). The method further includes receiving a first sound signal corresponding to an utterance of a user 5 of the HMD 120 (Step S2040). The method further includes executing image capturing in the virtual space 11 based on the first sound signal acting as a trigger (Step S2060).

(Configuration 2) The method according to Configuration 1 further includes arranging an avatar object 6A corresponding to the user 5 in the virtual space 11 (Step S2015). The executing of the image capturing includes capturing an image of at least a part of the avatar object 6A based on position information on the avatar object 6A (Step S2035).

(Configuration 3) In Configuration 2, the executing of the image capturing includes capturing an image of at least a part of the avatar object 6A based on a line-of-sight direction of the avatar object 6A and the position information on the avatar object 6A (Step S2035).

(Configuration 4) In Configuration 2 or Configuration 3, the executing of the image capturing includes arranging in the virtual space 11 an automatic camera configured to move in a pattern determined in advance with reference to the position of the avatar object 6A (FIG. 21), and executing image capturing by using the automatic camera.

(Configuration 5) In any one of Configuration 1 to Configuration 4, the executing of the image capturing includes executing image capturing when the first sound signal is a first level or higher determined in advance (YES in Step S2045).

(Configuration 6) In any one of Configuration 1 to Configuration 5, the executing of the image capturing includes extracting a character string from the first sound signal (Step S2050), and executing image capturing when the extracted character string includes a character string determined in advance (YES in Step S2055).

(Configuration 7) The method according to any one of Configuration 1 to Configuration 6 further includes arranging in the virtual space 11 the avatar object 6A corresponding to the user 5A (Step S2015) and arranging in the virtual space 11 an avatar object 6B corresponding to a user 5B of another computer 200B communicable to/from the computer 200A (Step S2015). The executing of the image capturing includes capturing an image of at least a part of each of the avatar objects 6A and 6B based on position information on the first and the avatar object 6B (Step S2810).

(Configuration 8) The method according to Configuration 7 further includes calculating a distance D between the avatar object 6A and the avatar object 6B (Step S2820). The executing of the image capturing includes executing capturing an image when the calculated distance D is less than a distance determined in advance (YES in Step S2820).

(Configuration 9) In Configuration 8, the executing of the image capturing includes, when the avatar objects 6A and 6B are facing each other (FIG. 22), executing image capturing in a direction orthogonal to a direction in which the avatar objects 6A and 6B are facing each other.

(Configuration 10) The method according to any one of Configuration 1 to Configuration 9 further includes receiving a second sound signal corresponding to an utterance of a user 5B of another computer 200B communicable to/from the computer 200A (Step S2040). The executing of the image capturing includes executing image capturing based on the first sound signal and the second sound signal acting as a trigger (Step S2910).

(Configuration 11) In Configuration 10, the executing of the photography includes executing image capturing when, after one of the first sound signal and the second sound signal of a second level or higher is received, a time until another of the first sound signal and the second sound signal of the second level or higher is received is less than a time determined in advance (YES in Step S2910).

One of ordinary skill in the art would understand that the embodiments disclosed herein are merely examples in all aspects and in no way intended to limit this disclosure. The scope of this disclosure is defined by the appended claims and not by the above description, and this disclosure encompasses all modifications made within the scope and spirit equivalent to those of the appended claims.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

What is claimed is:

1. A method, comprising:
    defining a virtual space;
    receiving a first sound signal from a first user associated with a head-mounted device (HMD);
    capturing an image in virtual space in response to receiving the first sound signal;
    storing the captured image corresponding to at least a part of the virtual space in response to capturing the image;
    receiving a second sound signal from a second user different from the first user;
    capturing the image in the virtual space in accordance with the reception of the first sound signal and the second sound signal;
    identifying a time difference between the reception of the second sound signal and the reception of the first sound signal; and
    capturing the image in response to the time difference being equal to or less than a predetermined threshold.

2. The method according to claim 1,
wherein the virtual space comprises a first virtual camera and a second virtual camera different from the first virtual camera, and
wherein the method further comprises:
    detecting a motion of the HMD;
    moving the first virtual camera in accordance with the detected motion of the HMD;
    defining a first visual field in the virtual space in accordance with the motion of the first virtual camera;
    generating a first visual-field image corresponding to the first visual field;
    outputting the first visual-field image to the HMD;
    defining a second visual field in the virtual space in accordance with a position of the second virtual camera in the virtual space;
    generating a second visual-field image corresponding to the second visual field; and
    storing, in response to capturing the image, the second visual-field image as the captured image.

3. The method according to claim 1,
wherein the virtual space comprises a first avatar associated with the first user, and
wherein the method further comprises:
    identifying a first position, which is a position of the first avatar in the virtual space;
    setting, based on the first position, in image capturing range in the virtual space such that at least a part of the first avatar is included in the image capturing range; and
    storing the captured image corresponding to the photographing range.

4. The method according to claim 3, further comprising:
identifying a line-of-sight direction of the first avatar; and
setting the image capturing range in accordance with the line-of-sight direction and the position of the first avatar in the virtual space.

5. The method according to claim 3,
wherein the virtual space comprises a first virtual camera and a second virtual camera different from the first virtual camera, and
wherein the method further comprises:
    detecting a motion of the HMD;
    moving the first virtual camera in accordance with the detected motion of the HMD;
    defining a first visual field in the virtual space in accordance with the motion of the first virtual camera;
    generating a first visual-field image corresponding to the first visual field;
    outputting the first visual-field image to the HMD;
    determining a movement path of the second virtual camera in the virtual space in accordance with the position of the first avatar in the virtual space;
    defining a second visual field in the virtual space in accordance with a position of the second virtual camera in the virtual space;
    generating a second visual-field image corresponding to the second visual field; and
    storing, in accordance with the capturing of the image, the second visual-field image as the captured image.

6. The method according to claim 1, further comprising:
detecting a magnitude of the first sound signal; and
capturing the image in response to the magnitude of the first sound signal being equal to or greater than a first threshold.

7. The method according to claim 1, further comprising:
extracting a character string from the first sound signal; and
capturing the image in response to the character string includes a first character string determined in advance.

* * * * *